(12) United States Patent
Nakamura

(10) Patent No.: US 10,585,263 B2
(45) Date of Patent: Mar. 10, 2020

(54) IMAGING LENS

(71) Applicant: Sony Corporation, Tokyo (JP)

(72) Inventor: Akira Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 15/774,866

(22) PCT Filed: Oct. 7, 2016

(86) PCT No.: PCT/JP2016/079994
§ 371 (c)(1),
(2) Date: May 9, 2018

(87) PCT Pub. No.: WO2017/086052
PCT Pub. Date: May 26, 2017

(65) Prior Publication Data
US 2018/0329180 A1    Nov. 15, 2018

(30) Foreign Application Priority Data
Nov. 20, 2015   (JP) ................. 2015-227644

(51) Int. Cl.
*G02B 13/00*   (2006.01)
*G02B 13/04*   (2006.01)
(Continued)

(52) U.S. Cl.
CPC .......... *G02B 13/0045* (2013.01); *G02B 9/62* (2013.01); *G02B 13/04* (2013.01); *G02B 13/06* (2013.01)

(58) Field of Classification Search
CPC ...... G02B 13/04; G02B 9/62; G02B 13/0045; G02B 13/06; G02B 13/005; G02B 9/64
(Continued)

(56) References Cited

U.S. PATENT DOCUMENTS 6,229,655 B1   5/2001  Kohno et al.
6,532,114 B1   3/2003  Kohno et al.
(Continued)

FOREIGN PATENT DOCUMENTS

JP   09-311273 A      12/1997
JP   2000-187157 A    7/2000
(Continued)

OTHER PUBLICATIONS

Written Opinion and English translation thereof dated Nov. 8, 2016 in connection with International Application No. PCT/JP2016/079994.
(Continued)

*Primary Examiner* — Jordan M Schwartz
(74) *Attorney, Agent, or Firm* — Wolf, Greenfield & Sacks, P.C.

(57) ABSTRACT

An imaging lens includes a first lens having a negative refractive power and a meniscus shape with a convex surface facing an object side; a second lens having a negative refractive power and a meniscus shape with a convex surface facing an object side; a third lens having a positive refractive power and a meniscus shape with a convex surface facing an object side; an aperture diaphragm; a fourth lens having a positive refractive power and a biconvex shape; a fifth lens having a negative refractive power and a biconcave shape and; and a sixth lens having a positive refractive power and a biconvex shape. The imaging lens as a whole is formed with the six lenses in six groups with six independent lenses, the imaging lens has a full angle of view of 150 degrees or more, and the imaging lens satisfies predetermined conditional expressions.

25 Claims, 7 Drawing Sheets

(51) Int. Cl.
  *G02B 13/06* (2006.01)
  *G02B 9/62* (2006.01)
(58) Field of Classification Search
  USPC .......................... 359/762, 749–752, 754–756
  See application file for complete search history.

(56) References Cited

U.S. PATENT DOCUMENTS

| | | |
|---|---|---|
| 9,158,094 B1* | 10/2015 | Chen ........................ G02B 9/62 |
| 2001/0013980 A1 | 8/2001 | Kohno et al. |
| 2014/0204479 A1* | 7/2014 | Asami .................... G02B 13/04 |
| | | 359/762 |
| 2017/0102526 A1* | 4/2017 | Chen ........................ G02B 9/62 |
| 2018/0341089 A1* | 11/2018 | Nakamura ............. G02B 13/04 |

FOREIGN PATENT DOCUMENTS

| | | |
|---|---|---|
| JP | 2008-112000 A | 5/2008 |
| JP | 2009-063877 A | 3/2009 |
| JP | 2013-003545 A | 1/2013 |
| JP | 2013-073155 A | 4/2013 |
| JP | 2013-073156 A | 4/2013 |

OTHER PUBLICATIONS

International Preliminary Report on Patentability and English translation thereof dated May 31, 2018 in connection with International Application No. PCT/JP2016/079994.
International Search Report and English translation thereof dated Nov. 8, 2016 in connection with International Application No. PCT/JP2016/079994.

* cited by examiner

IMAGING LENS

CROSS REFERENCE TO RELATED APPLICATIONS

This is a U.S. National Stage Application under 35 U.S.C. § 371, based on International Application No. PCT/JP2016/079994, filed Oct. 7, 2016, which claims priority to Japanese Patent Application JP 2015-227644, filed Nov. 20, 2015.

TECHNICAL FIELD

The present technology relates to a technical field of an imaging lens suitable for an on-board camera, a surveillance camera, a camera for a mobile device, for example.

CITATION LIST

Patent Document

Patent Document 1: Japanese Patent Application Laid-Open No. 2009-63877
Patent Document 2: Japanese Patent Application Laid-Open No. 2013-3545
Patent Document 3: Japanese Patent Application Laid-Open No. 2013-73156

BACKGROUND ART

In recent years, imaging apparatuses such as an on-board camera, a surveillance camera, and a camera for a mobile device have been widely used. With the miniaturization and increase in the number of pixels of an imaging element represented by a CCD or CMOS that captures an image formed by an imaging lens, there are increasing demands for the imaging apparatus equipped with a miniaturized and low-cost imaging lens achieving a wide angle of view with good peripheral resolution performance. Examples of imaging lenses satisfying these demands include lenses described in the following Patent Documents 1 to 3.

SUMMARY OF THE INVENTION

Problems to be Solved by the Invention

Patent Document 1 proposes an imaging lens including five lenses in four groups and having a full angle of view exceeding 180 degrees by suppressing chromatic aberration by joining a fourth lens including plastic and a fifth lens including plastic. In this technique, however, joining of the plastic lenses needs to use a bonding agent or to perform processing for bonding, and further includes a risk of changing the shape of the bonding surface with a temperature change, and this would increase a likelihood of separation of the bonded lenses from each other.

Patent Document 2 proposes an imaging lens including five lenses in five groups and having a full angle of view exceeding 180 degrees. This lens, however, has a rear lens group formed with two lenses, that is, one positive and one negative, leading to difficulty in completely correcting chromatic aberration, and in achieving satisfactory resolution performance up to the periphery.

Patent Document 3 is a document that has solved the problems in the above-mentioned two documents. Patent Document 3 proposes an imaging lens including six lenses in six groups and having a full angle of view exceeding 180 degrees, with lens power arrangement of negative-negative-positive-positive-negative-positive from an object side. In each of examples of the imaging lens, however, the first, fourth, and fifth lenses use glass as material, and above all, the first lens among the lenses having the largest volume and the largest effective lens surface uses a relatively expensive glass material having a refractive index Nd=1.7725 at the d-line of the glass and an Abbe number vd=49.6, leading to increased cost of the lens.

With these problems, there is a high demand for developing a miniaturized imaging lens with a wide angle of a full angle of view of 150 degrees or more and capable of providing high image quality with low cost, and further capable of maintaining a stable quality even in a harsh environment such as application as an on-board camera.

Accordingly, it is an object of the present technology to provide a miniaturized imaging lens of with a wide angle of a full angle of view of 150 degrees or more and capable of providing high image quality with low cost, and further capable of maintaining a stable quality even in a harsh environment such as application as an on-board camera.

Solutions to Problems

A first imaging lens according to the present technology includes, in order from an object side to an image plane side: a first lens having a negative refractive power and a meniscus shape with a convex surface facing an object side; a second lens having a negative refractive power and a meniscus shape with a convex surface facing an object side; a third lens having a positive refractive power and a meniscus shape with a convex surface facing an object side; an aperture diaphragm; a fourth lens having a positive refractive power and a biconvex shape; a fifth lens having a negative refractive power and a biconcave shape; and a sixth lens having a positive refractive power and a biconvex shape, the first imaging lens as a whole being formed with six groups of the six lenses being six independent lenses, the first imaging lens having a full angle of view of 150 degrees or more, and satisfying the following conditional expressions (1) and (2):

$$0 < (R8+R9)/(R8-R9) < 0.4 \quad (1)$$

$$2 < f456/f < 3, \quad (2)$$

where
R8 is a radius of curvature on an optical axis of an object side surface of the fourth lens,
R9 is a radius of curvature on an optical axis of an image side surface of the fourth lens,
f456 is a composite focal length of the fourth lens, the fifth lens, and the sixth lens, and
f is a focal length of an entire system.

A second imaging lens according to the present technology includes, in order from the object side to the image plane side: a first lens having a negative refractive power and a meniscus shape with a convex surface facing an object side; a second lens having a negative refractive power and a meniscus shape with a convex surface facing an object side; a third lens having a positive refractive power and a meniscus shape with a convex surface facing an object side; an aperture diaphragm; a fourth lens having a positive refractive power and a biconvex shape; a fifth lens having a negative refractive power and a biconcave shape; and a sixth lens having a positive refractive power and a biconvex shape, the second imaging lens as a whole being formed with six groups of the six lenses being six independent lenses, the second imaging lens having a full angle of view of 150 degrees or more, and satisfying the following conditional expressions (1) and (7):

$$0<(R8+R9)/(R8-R9)<0.4 \quad (1)$$

$$-4<f123/f<-2.7, \quad (7)$$

where

R8 is a radius of curvature on an optical axis of an object side surface of the fourth lens, R9 is a radius of curvature on an optical axis of an image side surface of the fourth lens, f123 is a composite focal length of the first lens, the second lens, and the third lens, and f is a focal length of an entire system.

A third imaging lens according to the present technology includes, in order from the object side to the image plane side: a first lens having a negative refractive power and a meniscus shape with a convex surface facing an object side; a second lens having a negative refractive power and a meniscus shape with a convex surface facing an object side; a third lens having a positive refractive power and a meniscus shape with a convex surface facing an object side; an aperture diaphragm; a fourth lens having a positive refractive power and a biconvex shape; a fifth lens having a negative refractive power and a biconcave shape; and a sixth lens having a positive refractive power and a biconvex shape, the third imaging lens as a whole being formed with six groups of the six lenses being six independent lenses, the third imaging lens having a full angle of view of 150 degrees or more, and satisfying the following conditional expressions (1) and (8):

$$0<(R8+R9)/(R8-R9)<0.4 \quad (1)$$

$$1.3<(R1+R2)/(R1-R2)<1.9, \quad (8)$$

where

R8 is a radius of curvature on an optical axis of an object side surface of the fourth lens, R9 is a radius of curvature on an optical axis of an image side surface of the fourth lens, R1 is a radius of curvature on an optical axis of an object side surface of the first lens, and R2 is a radius of curvature on an optical axis of an image side surface of the first lens.

A fourth imaging lens according to the present technology includes, in order from the object side to the image plane side: a first lens having a negative refractive power and a meniscus shape with a convex surface facing an object side; a second lens having a negative refractive power and a meniscus shape with a convex surface facing an object side; a third lens having a positive refractive power and a meniscus shape with a convex surface facing an object side; an aperture diaphragm; a fourth lens having a positive refractive power and a biconvex shape; a fifth lens having a negative refractive power and a biconcave shape; and a sixth lens having a positive refractive power and a biconvex shape, the fourth imaging lens as a whole being formed with six groups of the six lenses being six independent lenses, the fourth imaging lens having a full angle of view of 150 degrees or more, and satisfying the following conditional expressions (1) and (9):

$$0<(R8+R9)/(R8-R9)<0.4 \quad (1)$$

$$1<(R3+R4)/(R3-R4)<1.63, \quad (9)$$

where

R8 is a radius of curvature on an optical axis of an object side surface of the fourth lens, R9 is a radius of curvature on an optical axis of an image side surface of the fourth lens, R3 is a radius of curvature on an optical axis of an object side surface of the second lens, and R4 is a radius of curvature on an optical axis of an image side surface of the second lens.

A fifth imaging lens according to the present technology includes, in order from the object side to the image plane side: a first lens having a negative refractive power and a meniscus shape with a convex surface facing an object side; a second lens having a negative refractive power and a meniscus shape with a convex surface facing an object side; a third lens having a positive refractive power and a meniscus shape with a convex surface facing an object side; an aperture diaphragm; a fourth lens having a positive refractive power and a biconvex shape; a fifth lens having a negative refractive power and a biconcave shape; and a sixth lens having a positive refractive power and a biconvex shape, the fifth imaging lens as a whole being formed with six groups of the six lenses being six independent lenses, the fifth imaging lens having a full angle of view of 150 degrees or more, and satisfying the following conditional expressions (1) and (10):

$$0<(R8+R9)/(R8-R9)<0.4 \quad (1)$$

$$2.35<R5/f<5.5, \quad (10)$$

where

R8 is a radius of curvature on an optical axis of an object side surface of the fourth lens, R9 is a radius of curvature on an optical axis of an image side surface of the fourth lens, R5 is a radius of curvature on an optical axis of an object side surface of the third lens, and f is a focal length of an entire system.

With the first imaging lens to the fifth imaging lens according to the present technology, it is possible to provide a miniaturized imaging lens with a wide angle of a full angle of view of 150 degrees or more and capable of providing high image quality with low cost, and further capable of maintaining a stable quality even in a harsh environment such as application as an on-board camera.

Moreover, in the imaging lens according to the present technology, it is desirable that at least one of the following conditional expressions (3), (4), (5) and (6) be satisfied. The form may be either singly or in combination.

$$1.5<D4/f<2.3 \quad (3)$$

$$1<D2/f<2 \quad (4)$$

$$-8.5<f1/f<-6 \quad (5)$$

$$5.5<f3/f<8.5, \quad (6)$$

where

D4 is a distance on the optical axis between the image side surface of the second lens and the object side surface of the third lens, f is a focal length of the entire system, D2 is a distance on the optical axis between the image side surface of the first lens and the object side surface of the second lens, f1 is a focal length of the first lens, and f3 is a focal length of the third lens.

Effects of the Invention

According to the present technology, by setting the shape and power of each of the lenses to a preferable mode in the lens configuration of six lenses in six groups, it is possible to obtain a miniaturized imaging lens with a wide angle of a full angle of view of 150 degrees or more and capable of providing high image quality with low cost, and further capable of maintaining a stable quality even in a harsh environment such as application as an on-board camera.

Note that effects described herein are provided for purposes of exemplary illustration and are not intended to be limiting. Still other effects may also be contemplated.

MODE FOR CARRYING OUT THE INVENTION

[Imaging Lens According to Embodiment of Present Technology]

Hereinafter, an imaging lens according to an embodiment of the present technology will be described with reference to the drawings. Note that in the present technology, the lens shape including a convex surface and a concave surface, and the signs of the refractive power of a lens, such as a positive refractive power and a negative refractive power, are defined in a paraxial region. Moreover, the radius of curvature is also defined in the paraxial region, and the polarity is defined such that a surface being convex toward an object side is positive and that a surface being convex toward an image side is negative. Furthermore, the focal length of each of the lenses, composition, and entire system is defined as a wavelength value of d-line at 587.56 nm.

Figure 1:
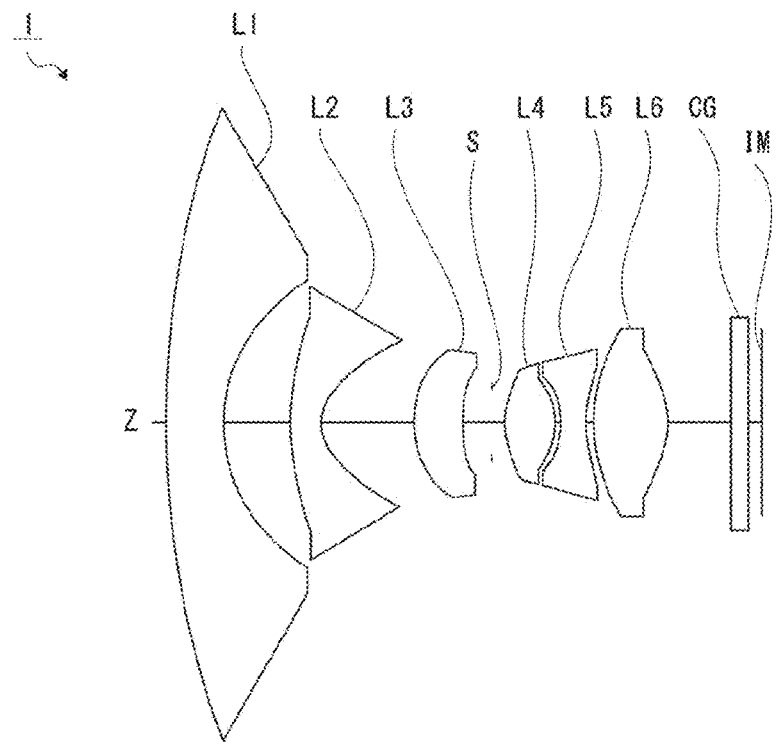
FIG. 1 is a cross-sectional view illustrating a first configuration example of an imaging lens according to an embodiment of the present technology.
Figure 2:
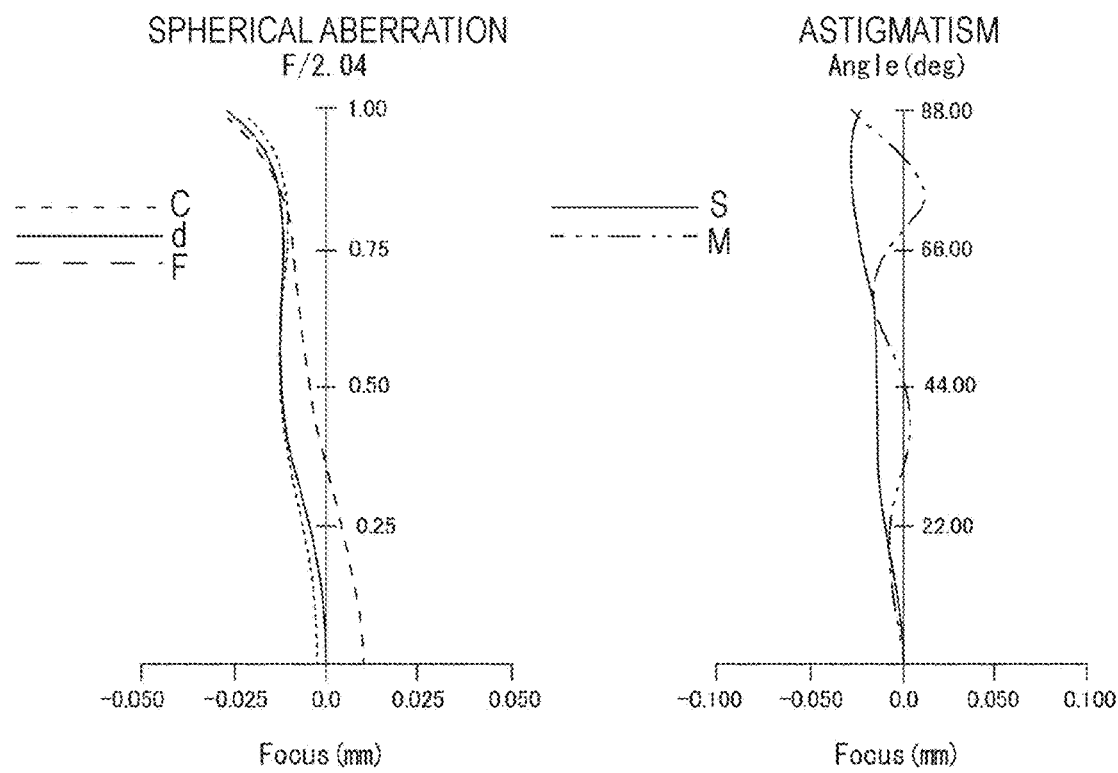
FIG. 2 is an aberration diagram illustrating various aberrations in Numerical Example 1 in which specific numerical values are applied to the imaging lens illustrated in FIG. 1.

FIG. 1 is a cross-sectional view illustrating Numerical Example 1 of the imaging lens according to an embodiment of the present technology. The imaging lens used in each of the second to sixth examples to be described below is configured and illustrated basically similarly to the imaging lens in the first embodiment illustrated in FIG. 1. Accordingly, an imaging lens according to an embodiment of the present technology will be described with reference to FIG. 1.

In FIG. 1, the left side is defined as the object side and the right side is defined as the image side, with the optical axis being represented by Z.

Imaging lenses (imaging lenses 1 to 6) according to an embodiment of the present technology are configured with six groups of six lenses including, in order from the object side to the image side along the optical axis Z: a first lens L1; a second lens L2; a third lens L3; the fourth lens L4; the fifth lens L5; and the sixth lens L6, each of the lenses being independently arranged. An aperture diaphragm S is arranged between the third lens L3 and the fourth lens L4. By arranging the aperture diaphragm S between the third lens L3 and the fourth lens L4, it is possible to achieve downsizing in a radial direction and suppress lateral chromatic aberration.

FIG. 1 also illustrates an image plane IM of the imaging lens in consideration of a case where the imaging lens is applied to an imaging apparatus. Moreover, a parallel plate CG as a cover glass and a low pass filter, to be needed at application of the imaging lens to the imaging apparatus, is arranged between the sixth lens L6 and the image plane IM of the imaging lens.

The first lens L1 has a negative refractive power and a meniscus shape with a convex surface facing the object side. This configuration of the first lens L1 would be advantageous in achieving a wide angle and correcting a distortion. Moreover, in examples, the first lens L1 includes a glass lens. This is because the first lens L1 arranged most toward the object side needs to achieve weather resistance, impact resistance, abrasion resistance, or the like, particularly in consideration of on-board applications. Moreover, each of surfaces of the first lens L1 is formed as a spherical surface because forming an aspherical surface using glass as a material might increase the cost. Therefore, it is allowable to form the surface as an aspherical surface in terms of design performance.

The second lens L2 has a negative refractive power and a meniscus shape with a convex surface facing the object side. With a configuration of arranging two lenses having negative refractive power on the object side next to each other, it is possible to share a large negative power with the two lenses. Furthermore, with the object-side surface of the second lens L2 formed into a convex surface, it is possible to bend an incident light ray from a wide angle of view stepwise into four shallow angles with four surfaces of the first lens L1 and the second lens L2, achieving a wide angle and distortion correction easily.

The third lens L3 has a positive refractive power and has a meniscus shape with a convex surface facing the object side. By arranging a lens having a positive power on the object side of the aperture diaphragm S, it is possible to facilitate correction of lateral chromatic aberration and field curvature.

Moreover, by arranging the aperture diaphragm S between the third lens L3 and the fourth lens L4, it is possible to reduce the size of the wide angle imaging lens in the radial direction.

The image side of the aperture diaphragm S includes the fourth lens L4 with a positive refractive power and a biconvex shape, the fifth lens L5 with a negative refractive power and a biconcave shape, and the sixth lens L6 with a positive refractive power and a biconvex shape, being arranged in order. With such a triplet configuration, it is possible to facilitate correction of various aberrations that affect the imaging performance.

In particular, by arranging the sixth lens L6 having a positive refractive power on the most image side in the imaging lens, it is possible to facilitate correction of a distance to the image plane as an image forming plane and an incidence angle of an off-axis ray on the image plane, namely, correction of back focus and shading.

The imaging lens according to the present technology satisfies conditional expression (1) and satisfies at least one of conditional expression (2), conditional expression (7), conditional expression (8), conditional expression (9), and conditional expression (10):

$$0<(R8+R9)/(R8-R9)<0.4 \quad (1)$$

$$2<f456/f<3, \quad (2)$$

$$-4<f123/f<-2.7 \quad (7)$$

$$1.3<(R1+R2)/(R1-R2)<1.9 \quad (8)$$

$$1<(R3+R4)/(R3-R4)<1.63 \quad (9)$$

$$2.35<R5/f<5.5, \quad (10)$$

where

R8 is a radius of curvature on an optical axis of an object side surface of the fourth lens, R9 is a radius of curvature on an optical axis of an image side surface of the fourth lens, f456 is a composite focal length of the fourth lens, the fifth lens, and the sixth lens, f is a focal length of an entire system, f123 is a composite focal length of the first lens, the second lens, and the third lens, R1 is a radius of curvature on an optical axis of an object side surface of the first lens, R2 is a radius of curvature on an optical axis of an image side surface of the first lens, R3 is a radius of curvature on an optical axis of an object side surface of the second lens, R4 is a radius of curvature on an optical axis of an image side surface of the second lens, and R5 is a radius of curvature on an optical axis of an object side surface of the third lens.

Conditional expression (1) is an expression to define a ratio of a sum of the radius of curvature on the optical axis of the object side surface of the fourth lens L4 and the radius of curvature on the optical axis of the image side surface of the fourth lens L4, to the difference between the radii of curvature. Since the fourth lens L4 has a biconvex shape, the expression indicates that the absolute value of the radius of curvature on the optical axis of the object side surface of the fourth lens L4 is larger than the radius of curvature on the optical axis of the image side surface. Below the lower limit of the numerical value, the radius of curvature on the optical axis of the object side surface of the fourth lens L4 is decreased, making it difficult to correct field curvature. Beyond the upper limit of the numerical value, it is difficult to correct the spherical aberration.

Conditional expression (2) is an expression to define a ratio of the composite focal length of the fourth lens L4, the fifth lens L5, and the sixth lens L6 arranged on the image side of the aperture diaphragm S, to the focal length of the entire system. Below the lower limit of the numerical value, a combined refractive power of the fourth lens L4, the fifth lens L5, and the sixth lens L6 is increased to make it difficult to obtain a back focus as the imaging lens, leading to problems in arrangement of filters and the like, image plane adjustment at a time of assembly, that is, focus adjustment of the imaging element represented by a CCD and a CMOS. This would also make it difficult to correct various aberrations including spherical aberration and field curvature. Beyond the upper limit of the numerical value, the combined refractive power of the fourth lens L4, the fifth lens L5, and the sixth lens L6 is decreased to increase the back focus as the imaging lens, increase a total length as the imaging lens, leading to an increased size of the imaging lens.

Conditional expression (7) is an expression to define a ratio of the composite focal length of the first lens L1, the second lens L2, and the third lens L3 arranged on the object side of the aperture diaphragm S, to the focal length of the entire system. Below the lower limit as the numerical value, the negative refractive powers of the first lens L1 and the second lens L2 are decreased, making it difficult to achieve a wide angle. Beyond the upper limit of the numerical value, the negative refractive power of the first lens L1 and the second lens L2 are increased, making it difficult to correct the field curvature.

Conditional expression (8) defines the ratio of a sum of the radius of curvature on the optical axis of the object side surface of the first lens L1 and the radius of curvature on the optical axis of the image side surface of the first lens L1, to the difference between these. Below the lower limit of the numerical value, the radius of curvature on the optical axis of the object side surface of the first lens L1 is increased to cause an increased cost with an enlargement of an optical effective diameter of the object side surface of the first lens L1, leading to enlargement as an imaging lens, impairing the commercial value of the lens. Moreover, this makes it difficult to perform correction of distortion aberration. Beyond the upper limit of the numerical value, the radius of curvature on the optical axis of the object side surface of the first lens L1 is decreased to weaken the refractive power of the first lens L1, making it difficult to achieve a wide angle.

Conditional expression (9) defines a ratio of a sum of the radius of curvature on the optical axis of the object side surface of the second lens L2 and the radius of curvature on the optical axis of the image side surface of the second lens L2, to the difference between the radii of curvature. Since the second lens L2 is formed in a meniscus shape with the convex surface facing the object side, the formula indicates that the radius of curvature on the optical axis of the object side surface of the second lens L2 is large and the radius of curvature on the optical axis of the image side surface of the second lens L2 is small. Accordingly, the meniscus shape having negative refractive power would not allow the lower limit value as a numerical value to be exceeded. Beyond the upper limit of the numerical value, the value of the radius of curvature on the optical axis of the object side surface of the second lens L2 approaches the value of the radius of curvature on the optical axis of the image side surface of the second lens L2, that is, the negative refractive power of the second lens L2 would be decreased. This makes it difficult to achieve a wide angle or correction of the field curvature.

Conditional expression (10) defines a ratio of the radius of curvature on the optical axis of the object side surface of the third lens L3 to the focal length of the entire system of the imaging lens. The expression means that the object side surface of the third lens L3 is convex toward the object side. Below the lower limit of the numerical value, the radius of curvature of the object side surface of the third lens L3 is decreased and the positive refractive power on the object side surface of the third lens L3 is increased, making it difficult to correct field curvature. Beyond the upper limit of the numerical value, the radius of curvature of the object side surface of the third lens L3 is increased and the positive refractive power on the object side surface of the third lens L3 is decreased, making it difficult to correct lateral chromatic aberration.

Alternatively, the imaging lens according to the present technology may be configured to satisfy the following conditional expressions (1-1), conditional expression (2-1), conditional expression (8-1), and conditional expression (10-1) respectively in place of the conditional expressions (1), conditional expression (2), conditional expression (8), and conditional expression (10):

$$0<(R8+R9)/(R8-R9)\leq 0.31 \quad (1\text{-}1)$$

$$2.4<f456/f<2.8 \quad (2\text{-}1)$$

$$1.4<(R1+R2)/(R1-R2)<1.8 \quad (8\text{-}1)$$

$$2.5<R5/f<5.1, \quad (10\text{-}1)$$

where

R8 is a radius of curvature on an optical axis of an object side surface of the fourth lens, R9 is a radius of curvature on an optical axis of an image side surface of the fourth lens, f456 is a composite focal length of the fourth lens, the fifth lens, and the sixth lens, f is a focal length of an entire system, R1 is a radius of curvature on an optical axis of an object side surface of the first lens, R2 is a radius of curvature on an optical axis of an image side surface of the first lens, and R5 is a radius of curvature on an optical axis of an object side surface of the third lens.

Moreover, in the imaging lens according to the present technology, it is desirable that at least one of the following conditional expressions (3), (4), (5) and (6) be satisfied. The form may be either singly or in combination.

$$1.5<D4/f<2.3 \quad (3)$$

$$1<D2/f<2 \quad (4)$$

$$-8.5<f1/f<-6 \quad (5)$$

$$5.5<f3/f<8.5, \quad (6)$$

where

D4 is a distance on the optical axis between the image side surface of the second lens and the object side surface of the third lens, f is a focal length of the entire system, D2 is a distance on the optical axis between the image side surface of the first lens and the object side surface of the second lens, f1 is a focal length of the first lens, and f3 is a focal length of the third lens.

Conditional expression (3) is an expression to define a ratio of the distance on the optical axis between the image side surface of the second lens L2 and the object side surface of the third lens L3 to the focal length of the entire system of the imaging lens. Below the lower limit of the numerical value, the on-axis luminous flux and the off-axis luminous flux come close to each other, making it difficult to perform independent correction of the axial aberration and the off-axis aberration. Specifically, it is difficult to correct distortion aberration, field curvature, and coma, as off-axis aberration. Beyond the upper limit of the numerical value, the total length of the imaging lens is increased, leading to enlargement of the imaging lens.

Conditional expression (4) is an expression to define a ratio of the distance on the optical axis between the image side surface of the first lens L1 and the object side surface of the second lens L2 to the focal length of the entire system of the imaging lens. Similarly to conditional expression (3), below the lower limit of the numerical value, the on-axis luminous flux and the off-axis luminous flux come close to each other, making it difficult to perform independent correction of the axial aberration and the off-axis aberration. Specifically, it is difficult to correct distortion aberration, field curvature, and coma, as off-axis aberration. Moreover, in an attempt to obtain a peripheral light amount ratio as the imaging lens, the image side surface of the first lens L1 and the object side surface of the second lens L2 would mechanically interfere with each other, leading to producing mechanical restrictions on the setting of the radius of curvature of the image side surface of the first lens L1 and the setting of the radius of curvature of the object side surface of the second lens L2, making it difficult to achieve wide angle design. Beyond the upper limit of the numerical value, the total length of the imaging lens is increased, leading to enlargement of the imaging lens.

Conditional expression (5) is an expression to define the ratio of the focal length of the first lens L1 to the focal length of the entire system of the imaging lens. The expression means that the first lens L1 has a negative refractive power. Below the lower limit as the numerical value, the negative refractive power of the first lens L1 is decreased, making it difficult to achieve a wide angle. Beyond the upper limit of the numerical value, the negative refractive power of the first lens L1 is increased, making it difficult to correct the distortion aberration.

Conditional expression (6) is an expression to define a ratio of the focal length of the third lens L3 to the focal length of the entire system of the imaging lens. The expression means that the third lens L3 has a positive refractive power. Below the lower limit of the numerical value, the positive refractive power of the third lens L3 is increased, making it difficult to correct the field curvature. Beyond the upper limit of the numerical value, the positive refractive power of the third lens L3 is decreased, making it difficult to correct the lateral chromatic aberration.

[Numerical Example of Imaging Lens]

Specific numerical examples of the imaging lens according to the present embodiment will be described. Herein, numerical examples in which specific numerical values are applied to the imaging lenses 1 to 6 of the configuration examples illustrated in FIGS. 1, 3, 5, 7, 9 and 11, respectively will be described.

The meanings or the like of symbols illustrated in each of the following tables and descriptions are as follows. "Surface number" indicates a number of the i-th surface counted from the object side to the image side. "Ri" indicates a paraxial value (mm) of the radius of curvature on the i-th surface, that is, the value on the optical axis. "Di" indicates a value (mm) of an axial surface distance between the i-th surface and the (i+1) th surface (lens center thickness or air space). "Ndi" indicates a value of a refractive index at the d-line (wavelength 587.56 nm) of a material of a lens, or the like, starting from the i-th surface. "vdi" represents a value of the Abbe number at the d-line of a material of a lens, or the like, starting from the i-th surface. The portion where the value of "Ri" is "∞" indicates a plane or a diaphragm surface (aperture diaphragm S). In the "surface number", the surface marked as "diaphragm" indicates that it is the aperture diaphragm S.

Some lenses used in individual numerical examples have lens surfaces formed as aspherical surfaces. In the "surface number", the surface marked with "*" indicates that the surface is an aspherical surface. The aspherical shape is defined by the following equation. In each of tables illustrating aspherical coefficients, "E-n" represents an exponential notation having ten as a base, that is, "minus n-th power of ten". For example, "1.2345E-05" indicates "1.2345× (minus fifth power of ten)".

The shape of the aspherical surface is represented by the following expression.

$$Z=[(Y^2/R)/[1+\mathrm{SQRT}\{1-(1+K)*(Y/R)^2\}]+AA*Y^4+AB*Y^6+AC*Y^8+AD*Y^{10}+AE*Y^{12}$$

In the above-described aspherical expression, a distance in an optical axis direction from an apex of the lens surface is defined as "Z", and the polarity on the image plane side is defined as positive. A height in a direction perpendicular to the optical axis is defined as "Y", the radius of curvature on the optical axis of the surface is defined as R, and the conic constant is defined as "K". "AA", "AB", "AC", "AD", and "AE" respectively indicate a fourth order, sixth order, eighth order, tenth order, and twelfth order aspherical surface coefficients.

Each of the imaging lenses 1 to 6 to which the following numerical examples are applied has a full angle of view of 176 degrees or more and includes, in order from the object side to the image plane side, the first lens L1 having a negative refractive power and a meniscus shape with a convex surface facing the object side, the second lens L2 of having a negative refractive power and a meniscus shape with a convex surface facing the object side, the third lens L3 having a positive refractive power and a meniscus shape with a convex surface facing the object side, the aperture diaphragm S, the fourth lens L4 having a positive refractive power and a biconvex shape, the fifth lens L5 of having a negative refractive power and a biconcave shape, and the sixth lens L6 having a positive refractive power and a biconvex shape, and an image is formed on the image plane IM through the parallel plate CG. The first lens L1 includes glass with both surfaces being spherical. Each of the second lens L2 to the sixth lens L6 includes plastic, with both surfaces being aspherical surfaces. Moreover, the image plane position is set such that an object point is focused in a case where it is arranged at a position 400 mm from the apex of the object side surface of the first lens L1. Although distortion characteristics are not illustrated in the various aberrations in the figure, equidistance projection system is adopted in any of them, and increase and decrease in magnification for a specific angle of view are applied depending on examples.

Lens data of Numerical Example 1 in the imaging lens 1 illustrated in FIG. 1 is listed in Table 1-1, and aspherical data is listed in Table 1-2. The full angle of view is 176 degrees, the F value is 2.04, and the focal length f of the entire system of the imaging lens is 1.033 mm.

TABLE 1-1

| SURFACE No. | Ri | Di | Ndi | ν di |
|---|---|---|---|---|
| 1 | 18.577 | 1.300 | 1.589 | 61.3 |
| 2 | 3.500 | 1.406 | | |
| 3* | 10.115 | 0.700 | 1.544 | 55.5 |
| 4* | 1.161 | 1.927 | | |
| 5* | 2.615 | 1.100 | 1.64 | 23.5 |
| 6* | 6.334 | 0.600 | | |
| DIAPHRAGM | ∞ | 0.300 | | |
| 8* | 2.472 | 1.029 | 1.544 | 55.5 |
| 9* | -1.304 | 0.100 | | |
| 10* | -1.716 | 0.600 | 1.64 | 23.5 |
| 11* | 2.269 | 0.100 | | |
| 12* | 2.418 | 1.679 | 1.544 | 55.5 |
| 13* | -1.587 | 1.304 | | |
| 14 | ∞ | 0.400 | 1.5168 | 64.2 |
| 15 | ∞ | 0.300 | | |
| IM | ∞ | 0.000 | | |

TABLE 1-2

| ASPHERICAL | Ki | AAi | ABi | ACi | ADi | AEi |
|---|---|---|---|---|---|---|
| 3 | 0 | 3.4436E-02 | -1.0145E-02 | 1.0482E-03 | -3.9695E-05 | 0 |
| 4 | -7.9700E-01 | 6.5019E-02 | 3.8251E-02 | -3.2542E-02 | 4.7410E-03 | 0 |
| 5 | 0 | 3.7812E-02 | 6.2761E-03 | 3.2314E-03 | -1.6234E-03 | 0 |
| 6 | 0 | 5.3788E-02 | 4.2469E-02 | -1.0667E-02 | 1.1874E-03 | 0 |
| 8 | 0 | 2.9471E-02 | -1.8577E-02 | 1.5895E-02 | -1.9374E-03 | 0 |
| 9 | 0 | 1.5074E-01 | -9.6614E-03 | -5.9533E-02 | 5.4091E-02 | 0 |
| 10 | 0 | -3.4047E-02 | 6.6492E-02 | -9.8507E-02 | 4.9482E-02 | 0 |
| 11 | 0 | -1.2471E-01 | 7.6349E-02 | -3.1562E-02 | 6.0730E-03 | 0 |
| 12 | 0 | -3.8255E-02 | 1.0059E-02 | -1.4042E-03 | -8.9348E-05 | 0 |
| 13 | -4.8429E-01 | 4.6031E-02 | 9.9202E-03 | -5.9845E-03 | 2.7622E-03 | -4.2131E-04 |

Figure 3:
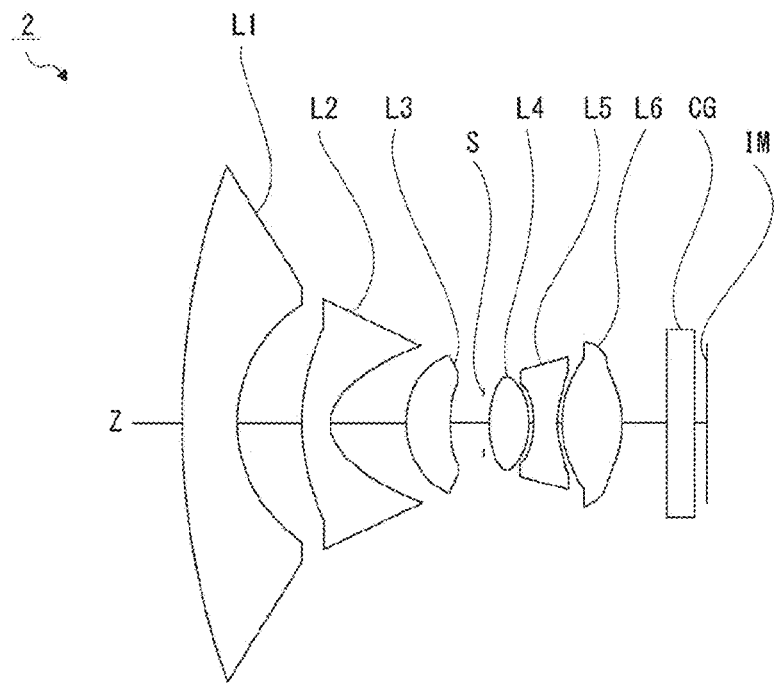
FIG. 3 is a cross-sectional view illustrating a second configuration example of the imaging lens.
Figure 4:
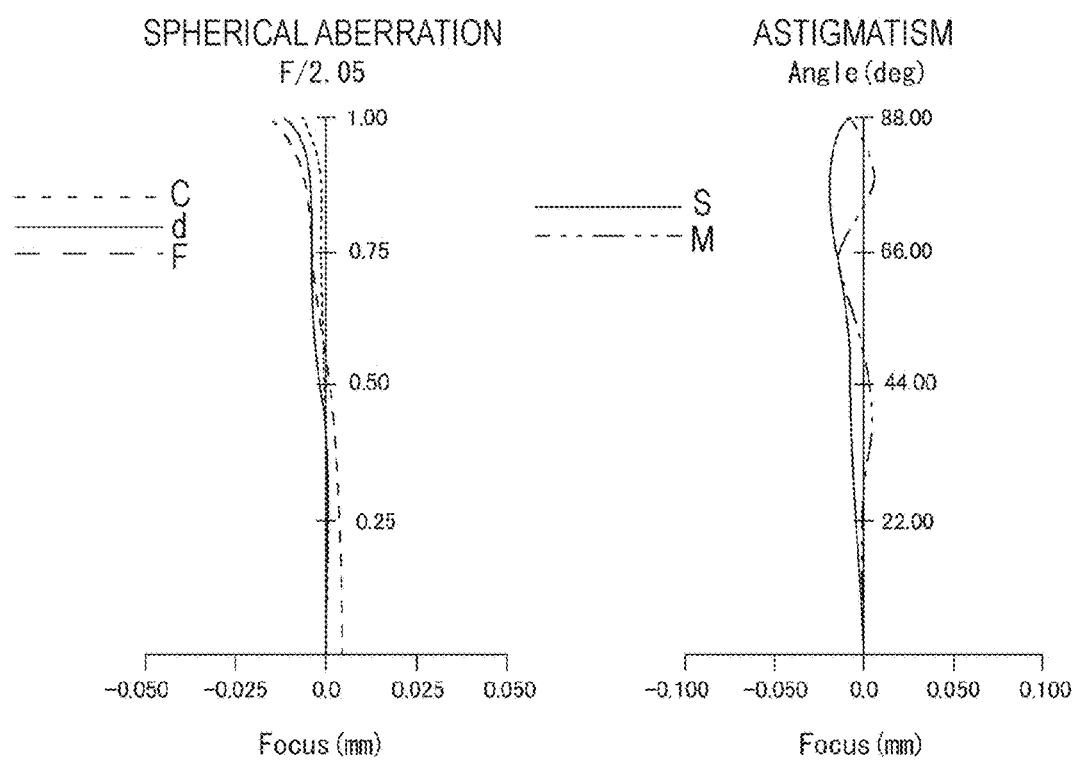
FIG. 4 is an aberration diagram illustrating various aberrations in Numerical Example 2 in which specific numerical values are applied to the imaging lens illustrated in FIG. 3.

Lens data of Numerical Example 2 in an imaging lens 2 illustrated in FIG. 3 is listed in Table 2-1, and aspherical data is listed in Table 2-2. The full angle of view is 176 degrees, the F value is 2.03, and the focal length f of the entire system of the imaging lens is 1.028 mm.

TABLE 2-1

| SURFACE No. | Ri | Di | Ndi | ν di |
|---|---|---|---|---|
| 1 | 19.543 | 1.300 | 1.589 | 61.3 |
| 2 | 3.500 | 1.560 | | |
| 3* | 5.771 | 0.700 | 1.544 | 55.5 |
| 4* | 1.024 | 1.860 | | |
| 5* | 2.735 | 1.100 | 1.64 | 23.5 |
| 6* | 7.356 | 0.780 | | |
| DIAPHRAGM | ∞ | 0.173 | | |
| 8* | 2.318 | 0.961 | 1.544 | 55.5 |
| 9* | -1.561 | 0.100 | | |
| 10* | -2.256 | 0.600 | 1.64 | 23.5 |
| 11* | 2.160 | 0.100 | | |
| 12* | 2.119 | 1.432 | 1.544 | 55.5 |
| 13* | -1.927 | 1.109 | | |
| 14 | ∞ | 0.700 | 1.5168 | 64.2 |
| 15 | ∞ | 0.300 | | |
| IM | ∞ | 0.000 | | |

TABLE 2-2

| ASPHERICAL | Ki | AAi | ABi | ACi | ADi | AEi |
|---|---|---|---|---|---|---|
| 3 | 0 | 3.0329E-02 | -9.9416E-03 | 1.0060E-03 | -3.5865E-05 | 0 |
| 4 | -8.5942E-01 | 6.9583E-02 | 2.9896E-02 | -3.1634E-02 | 5.0655E-03 | 0 |
| 5 | 0 | 2.9852E-02 | 1.1882E-02 | -5.8571E-04 | 1.1092E-04 | 0 |
| 6 | 0 | 4.4519E-02 | 4.2903E-02 | -1.5361E-02 | 1.0761E-02 | 0 |
| 8 | 0 | 2.0063E-02 | 2.1055E-02 | -3.9016E-02 | 1.4550E-02 | 0 |
| 9 | 0 | 1.0708E-01 | -2.5404E-02 | -5.3309E-02 | 1.1417E-02 | 0 |
| 10 | 0 | -4.8632E-02 | 5.0313E-02 | -1.1786E-01 | 2.9164E-02 | 0 |
| 11 | 0 | -1.2923E-01 | 7.0664E-02 | -3.0940E-02 | 6.9463E-03 | 0 |
| 12 | 0 | -5.0485E-02 | 1.1102E-02 | -1.0825E-03 | -5.1252E-04 | 0 |
| 13 | -6.0301E-01 | 4.8583E-02 | 8.9997E-03 | -5.9236E-03 | 2.4119E-03 | -4.8736E-04 |

Figure 5:
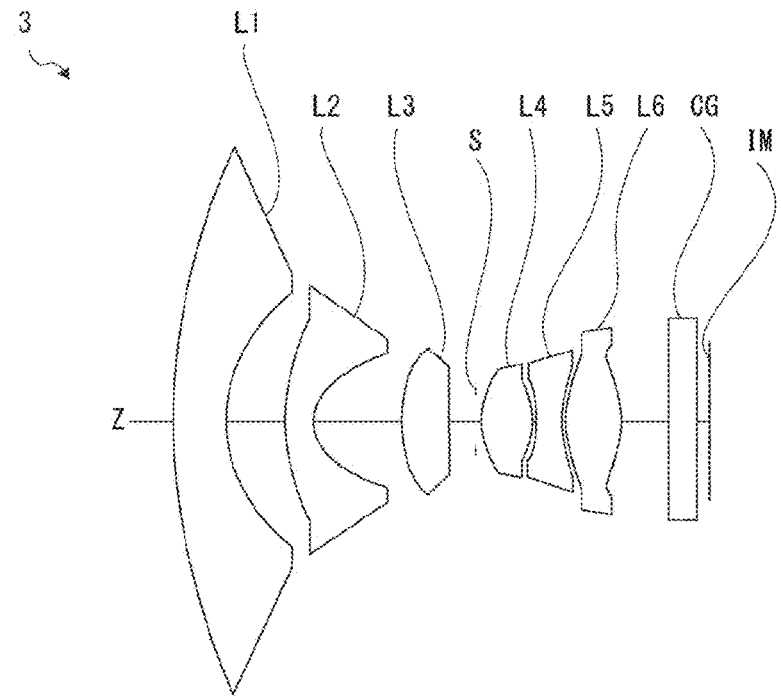
FIG. 5 is a cross-sectional view illustrating a third configuration example of the imaging lens.
Figure 6:
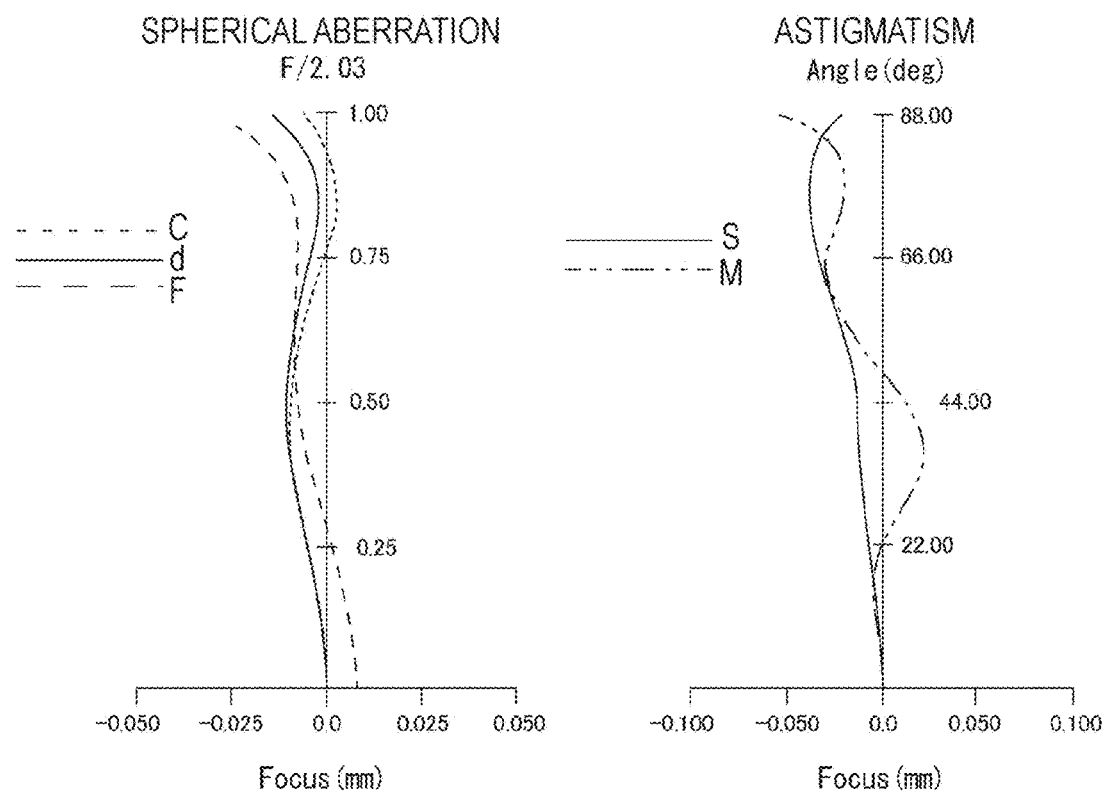
FIG. 6 is an aberration diagram illustrating various aberrations in Numerical Example 3 in which specific numerical values are applied to the imaging lens illustrated in FIG. 5.

Lens data of Numerical Example 3 in an imaging lens 3 illustrated in FIG. 5 is listed in Table 3-1, and aspherical data is listed in Table 3-2. The full angle of view is 176 degrees, the F value is 2.03, and the focal length f of the entire system of the imaging lens is 1.215 mm.

TABLE 3-1

| SURFACE No. | Ri | Di | Ndi | ν di |
|---|---|---|---|---|
| 1 | 14.685 | 1.300 | 1.589 | 61.3 |
| 2 | 3.500 | 1.386 | | |
| 3* | 4.799 | 0.700 | 1.544 | 55.5 |
| 4* | 1.127 | 2.140 | | |
| 5* | 4.524 | 1.100 | 1.64 | 23.5 |
| 6* | 30.461 | 0.642 | | |
| DIAPHRAGM | ∞ | 0.210 | | |
| 8* | 2.114 | 1.208 | 1.544 | 55.5 |
| 9* | -1.586 | 0.100 | | |
| 10* | -2.629 | 0.600 | 1.64 | 23.5 |
| 11* | 1.833 | 0.103 | | |
| 12* | 2.204 | 1.352 | 1.544 | 55.5 |
| 13* | -2.454 | 1.109 | | |
| 14 | ∞ | 0.700 | 1.5168 | 64.2 |
| 15 | ∞ | 0.300 | | |
| IM | ∞ | 0.000 | | |

TABLE 3-2

| ASPHERICAL | Ki | AAi | ABi | ACi | ADi | AEi |
|---|---|---|---|---|---|---|
| 3 | 0 | 2.6785E-02 | -9.7144E-03 | 1.0430E-03 | -3.9665E-05 | 0 |
| 4 | -7.5138E-01 | 7.7228E-02 | 3.6707E-02 | -2.5148E-02 | 4.4700E-03 | 0 |
| 5 | 0 | 1.2697E-02 | 5.5252E-03 | -9.1430E-04 | 3.8159E-04 | 0 |
| 6 | 0 | -1.1562E-02 | 1.9705E-02 | -1.1173E-02 | 5.0314E-03 | 0 |
| 8 | 0 | -1.2927E-02 | -2.4646E-03 | 9.8509E-03 | -2.3863E-03 | 0 |
| 9 | 0 | 1.2509E-01 | 3.9704E-03 | -5.7519E-02 | 3.4677E-02 | 0 |
| 10 | 0 | -1.8152E-02 | 6.0299E-02 | -1.0437E-01 | 4.4288E-02 | 0 |
| 11 | 0 | -1.3637E-01 | 6.8604E-02 | -3.3841E-02 | 4.6354E-03 | 0 |
| 12 | 0 | -6.1061E-02 | 1.5642E-02 | -4.7177E-04 | -1.2291E-03 | 0 |
| 13 | 1.7630E-01 | 1.1604E-02 | 6.1994E-03 | -3.8972E-03 | 3.2598E-03 | 3.2598E-03 |

Figure 7:
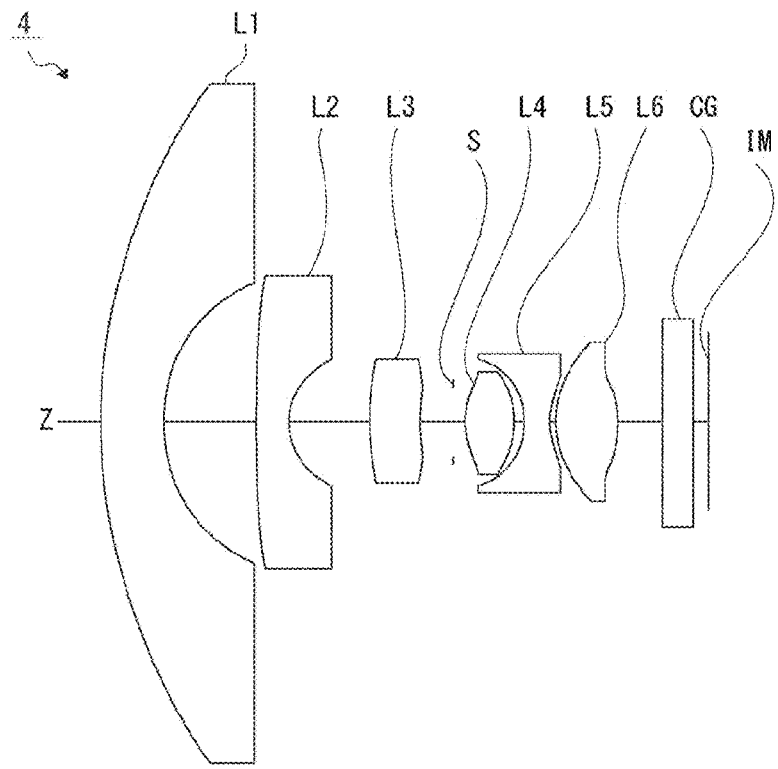
FIG. 7 is a cross-sectional view illustrating a fourth configuration example of the imaging lens.
Figure 8:
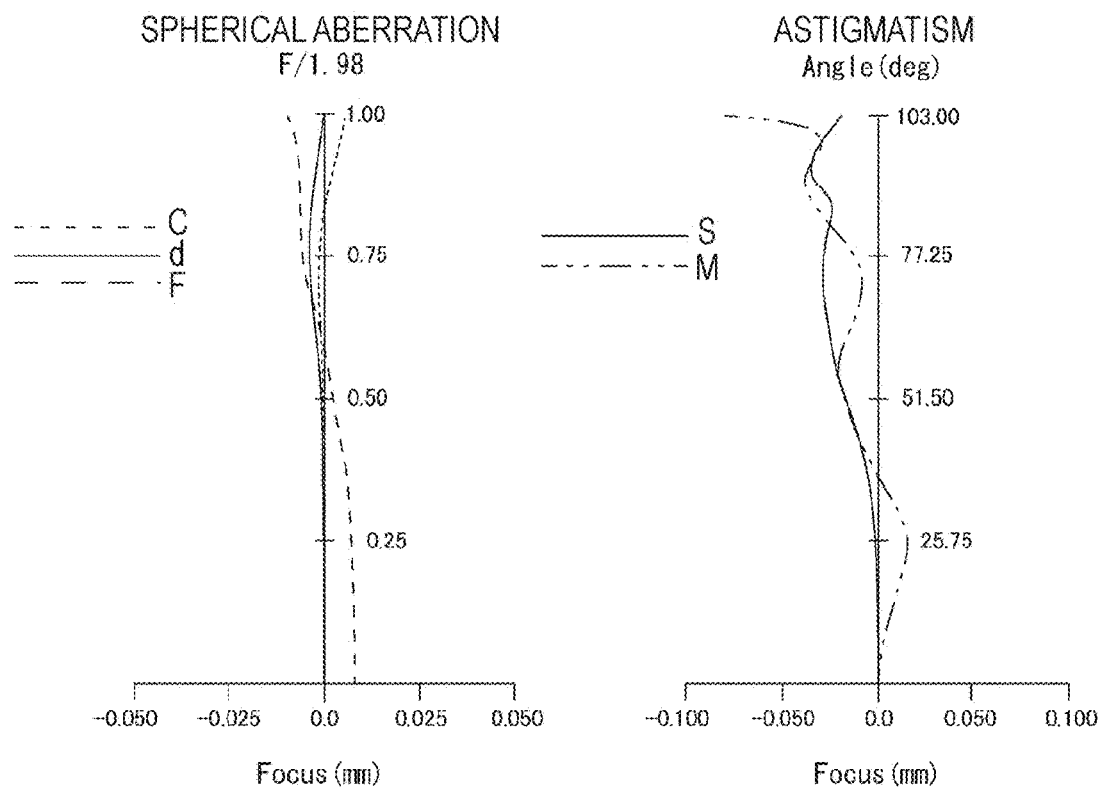
FIG. 8 is an aberration diagram illustrating various aberrations in Numerical Example 4 in which specific numerical values are applied to the imaging lens illustrated in FIG. 7.

Lens data of Numerical Example 4 in an imaging lens 4 illustrated in FIG. 7 is listed in Table 4-1, and aspherical data is listed in Table 4-2. The full angle of view is 206 degrees, the F value is 1.98, and the focal length f of the entire system of the imaging lens is 1.053 mm.

TABLE 4-1

| SURFACE No. | Ri | Di | Ndi | ν di |
|---|---|---|---|---|
| 1 | 12.909 | 1.300 | 1.589 | 61.3 |
| 2 | 3.300 | 2.013 | | |
| 3* | 9620.832 | 0.700 | 1.544 | 55.5 |
| 4* | 1.422 | 1.746 | | |
| 5* | 5.319 | 1.100 | 1.64 | 23.5 |

TABLE 4-1-continued

| SURFACE No. | Ri | Di | Ndi | ν di |
|---|---|---|---|---|
| 6* | 8267.985 | 0.600 | | |
| DIAPHRAGM | ∞ | 0.300 | | |
| 8* | 1.793 | 1.070 | 1.544 | 55.5 |
| 9* | -1.541 | 0.183 | | |
| 10* | -1.992 | 0.600 | 1.64 | 23.5 |
| 11* | 1.677 | 0.100 | | |
| 12* | 2.104 | 1.360 | 1.544 | 55.5 |
| 13* | -1.748 | 0.900 | | |
| 14 | ∞ | 0.700 | 1.5168 | 64.2 |
| 15 | ∞ | 0.300 | | |
| IM | ∞ | 0.000 | | |

TABLE 4-2

| ASPHERICAL | Ki | AAi | ABi | ACi | ADi | AEi |
|---|---|---|---|---|---|---|
| 3 | 0 | 2.5893E−03 | −3.2905E−04 | 1.9129E−05 | 0 | 0 |
| 4 | 0 | −3.8759E−03 | −3.1168E−03 | 2.7953E−03 | 0 | 0 |
| 5 | 0 | −2.1847E−02 | 3.0217E−04 | 3.1910E−03 | 0 | 0 |
| 6 | 0 | −6.0505E−02 | 1.5662E−02 | −1.8706E−04 | 0 | 0 |
| 8 | 0 | −4.1726E−02 | 2.9619E−02 | −3.2707E−02 | 0 | 0 |
| 9 | 0 | 2.0049E−01 | −1.3969E−01 | 1.8474E−02 | 0 | 0 |
| 10 | 0 | 7.8354E−02 | −1.8346E−01 | 4.3949E−02 | 0 | 0 |
| 11 | 0 | −1.2824E−01 | 1.4578E−02 | −1.0334E−02 | 0 | 0 |
| 12 | 0 | −3.3624E−02 | 1.2799E−02 | −1.3911E−03 | 0 | 0 |
| 13 | 0 | 6.6830E−02 | −1.3898E−02 | 2.2002E−02 | 0 | 0 |

Figure 9:
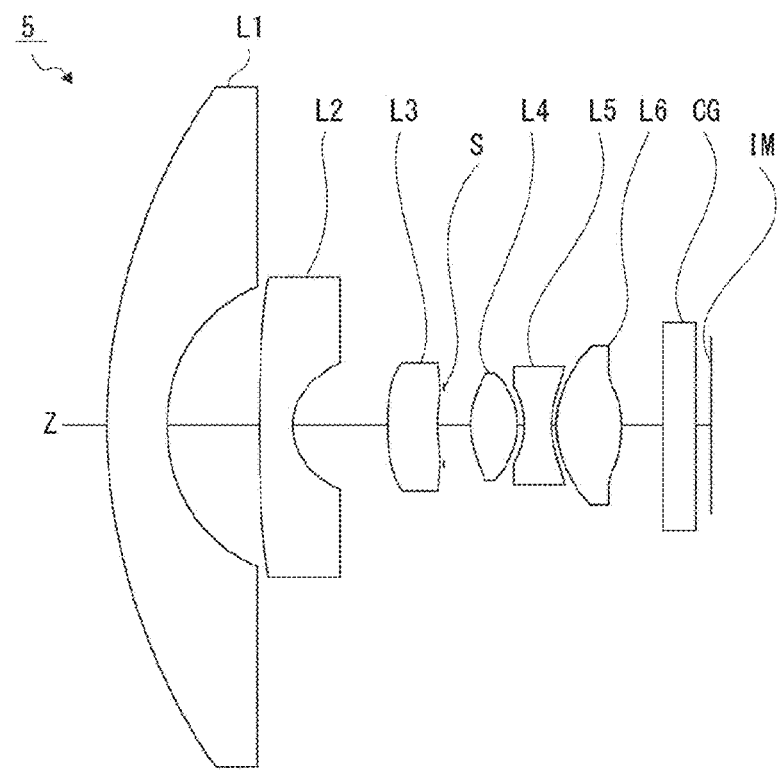
FIG. 9 is a cross-sectional view illustrating a fifth configuration example of the imaging lens.
Figure 10:
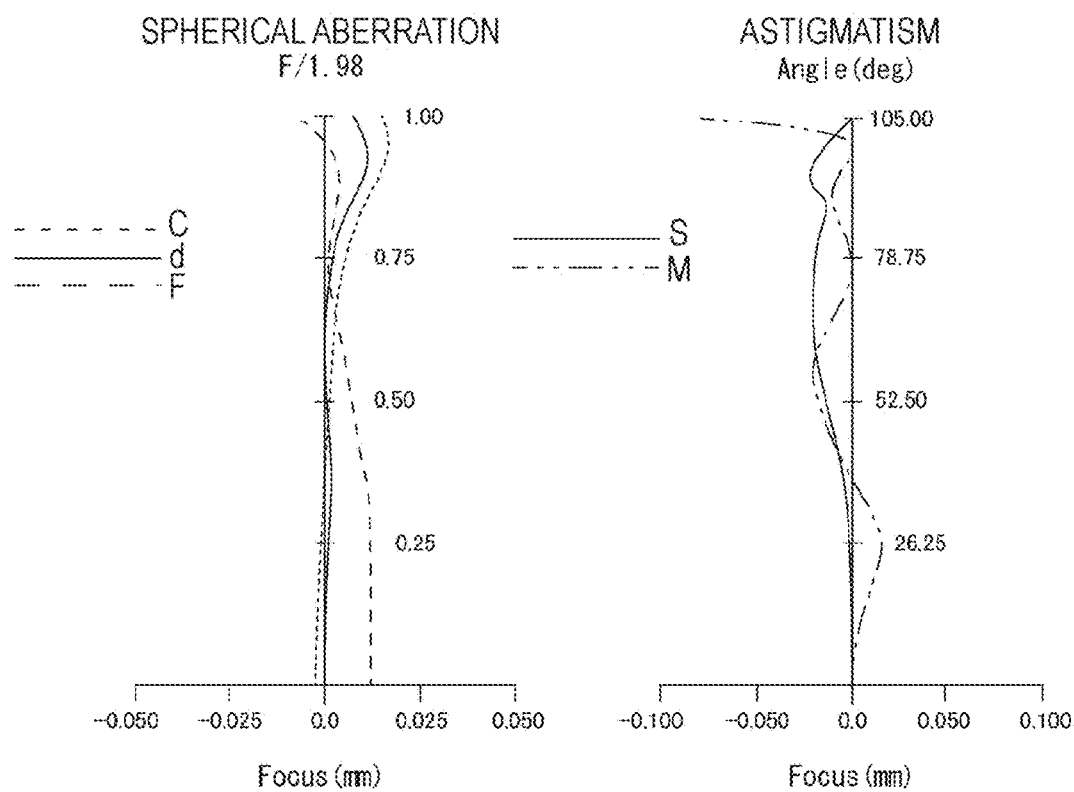
FIG. 10 is an aberration diagram illustrating various aberrations in Numerical Example 5 in which specific numerical values are applied to the imaging lens illustrated in FIG. 9.

Lens data of Numerical Example 5 in an imaging lens 5 illustrated in FIG. 9 is listed in Table 5-1, and aspherical data is listed in Table 5-2. The full angle of view is 210 degrees, the F value is 1.98, and the focal length f of the entire system of the imaging lens is 1.047 mm.

TABLE 5-1

| SURFACE No. | Ri | Di | Ndi | ν di |
|---|---|---|---|---|
| 1 | 12.277 | 1.300 | 1.589 | 61.3 |
| 2 | 3.300 | 1.966 | | |
| 3* | 9212.621 | 0.700 | 1.544 | 55.5 |
| 4* | 1.341 | 2.029 | | |
| 5* | 4.633 | 1.100 | 1.64 | 23.5 |
| 6* | 13057.199 | 0.100 | | |
| DIAPHRAGM | ∞ | 0.575 | | |
| 8* | 1.849 | 1.020 | 1.544 | 55.5 |
| 9* | −1.311 | 0.130 | | |
| 10* | −1.683 | 0.600 | 1.64 | 23.5 |
| 11* | 1.740 | 0.100 | | |
| 12* | 2.064 | 1.382 | 1.544 | 55.5 |
| 13* | −2.042 | 0.900 | | |
| 14 | ∞ | 0.700 | 1.5168 | 64.2 |
| 15 | ∞ | 0.300 | | |
| IM | ∞ | 0.000 | | |

TABLE 5-2

| ASPHERICAL | Ki | AAi | ABi | ACi | ADi | AEi |
|---|---|---|---|---|---|---|
| 3 | 0 | 2.7588E−03 | −1.6593E−04 | 7.4440E−06 | 0 | 0 |
| 4 | 0 | −1.7354E−02 | 1.4272E−03 | −6.9286E−04 | 0 | 0 |
| 5 | 0 | −2.0391E−02 | 4.5371E−03 | 1.3477E−02 | 0 | 0 |
| 6 | 0 | −6.6375E−02 | 2.7480E−02 | 2.5177E−02 | 0 | 0 |
| 8 | 0 | −7.2033E−02 | 3.1991E−02 | −1.4699E−02 | 0 | 0 |
| 9 | 0 | 1.9685E−01 | −1.4117E−01 | 6.4388E−02 | 0 | 0 |
| 10 | 0 | 8.7979E−02 | −1.5699E−01 | 5.1544E−02 | 0 | 0 |
| 11 | 0 | −1.0977E−01 | 1.6115E−02 | −9.9127E−03 | 0 | 0 |
| 12 | 0 | −4.0279E−02 | 1.2890E−02 | −1.5789E−03 | 0 | 0 |
| 13 | 0 | 5.3300E−02 | −1.3081E−02 | 1.4339E−02 | 0 | 0 |

Figure 11:
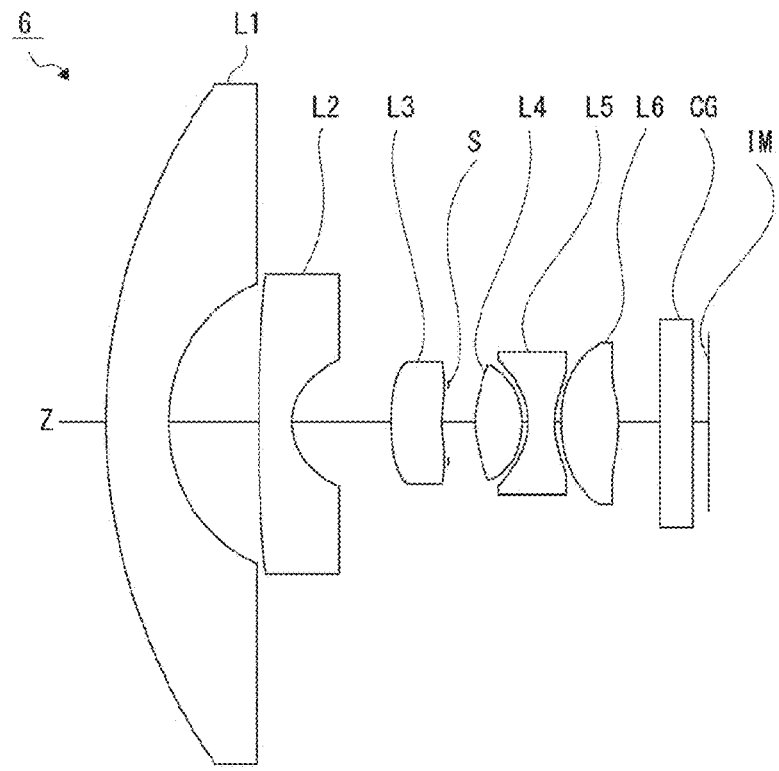
FIG. 11 is a cross-sectional view illustrating a sixth configuration example of the imaging lens.
Figure 12:
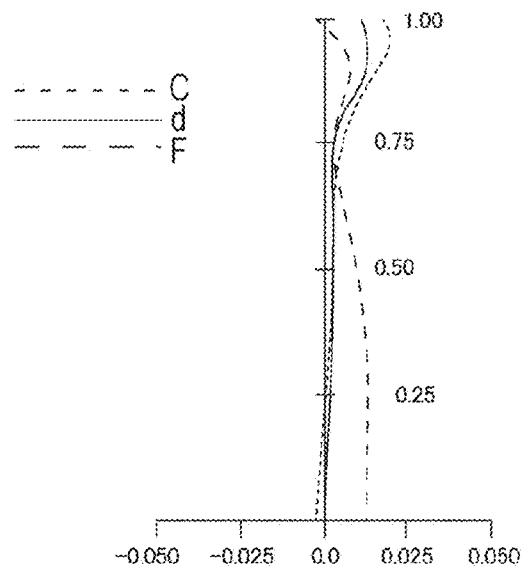
FIG. 12 is an aberration diagram illustrating various aberrations in Numerical Example 6 in which specific numerical values are applied to the imaging lens illustrated in FIG. 11.
Figure 12:
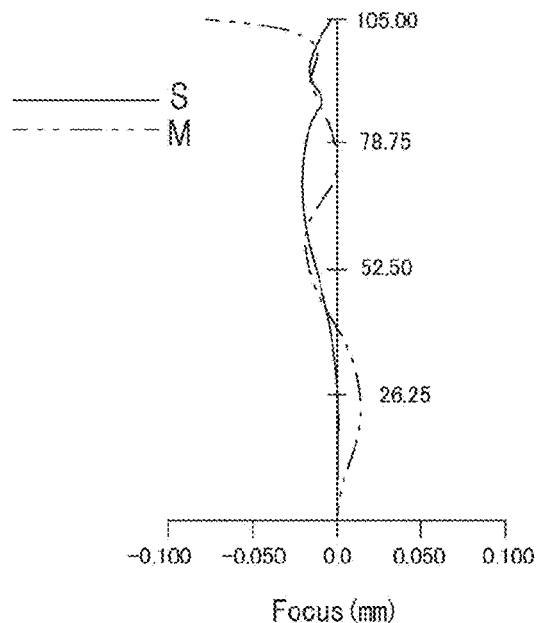

Lens data of Numerical Example 6 in an imaging lens 6 illustrated in FIG. 11 is listed in Table 6-1, and aspherical data is listed in Table 6-2. The full angle of view is 210 degrees, the F value is 1.98, and the focal length f of the entire system of the imaging lens is 1.046 mm.

TABLE 6-1

| SURFACE No. | Ri | Di | Ndi | ν di |
|---|---|---|---|---|
| 1 | 12.580 | 1.300 | 1.589 | 61.3 |
| 2 | 3.300 | 1.957 | | |
| 3* | 29589.346 | 0.700 | 1.544 | 55.5 |
| 4* | 1.390 | 2.153 | | |
| 5* | 4.567 | 1.100 | 1.64 | 23.5 |
| 6* | 13667.987 | 0.100 | | |
| DIAPHRAGM | ∞ | 0.549 | | |
| 8* | 1.867 | 1.042 | 1.544 | 55.5 |
| 9* | −1.258 | 0.100 | | |
| 10* | −1.692 | 0.600 | 1.64 | 23.5 |
| 11* | 1.737 | 0.100 | | |
| 12* | 2.103 | 1.295 | 1.544 | 55.5 |
| 13* | −2.245 | 0.900 | | |
| 14 | ∞ | 0.700 | 1.5168 | 64.2 |
| 15 | ∞ | 0.300 | | |
| IM | ∞ | 0.000 | | |

TABLE 6-2

| ASPHERICAL | Ki | AAi | ABi | ACi | ADi | AEi |
|---|---|---|---|---|---|---|
| 3 | 0 | 5.1483E−03 | −5.8791E−04 | 2.4803E−05 | 0 | 0 |
| 4 | 0 | 1.0057E−02 | −3.2449E−03 | 4.7078E−03 | 0 | 0 |
| 5 | 0 | −1.8194E−03 | 3.7689E−03 | 1.1519E−02 | 0 | 0 |
| 6 | 0 | −4.3317E−02 | 2.1642E−02 | 2.9678E−02 | 0 | 0 |
| 8 | 0 | −7.1615E−02 | 3.5525E−02 | −2.2144E−02 | 0 | 0 |
| 9 | 0 | 1.9352E−01 | −1.3146E−01 | 6.9754E−02 | 0 | 0 |
| 10 | 0 | 7.3951E−02 | −1.4480E−01 | 6.2021E−02 | 0 | 0 |
| 11 | 0 | −9.9973E−02 | 7.7049E−03 | −7.9676E−03 | 0 | 0 |
| 12 | 0 | −3.0918E−02 | 1.1819E−02 | −1.1136E−03 | 0 | 0 |
| 13 | 0 | 3.6735E−02 | −7.7765E−03 | 1.8461E−02 | 0 | 0 |

Main specifications of Numerical Examples 1 to 6, and the values of conditional expressions (1) to (10) are illustrated in Table 7.

TABLE 7

| | | EXAMPLE 1 | EXAMPLE 2 | EXAMPLE 3 | EXAMPLE 4 | EXAMPLE 5 | EXAMPLE 6 |
|---|---|---|---|---|---|---|---|
| SPECIFICATION | FULL ANGLE OF VIEW | 176 | 176 | 176 | 206 | 210 | 210 |
| SPECIFICATION | F VALUE | 2.04 | 2.03 | 2.03 | 1.98 | 1.98 | 1.98 |
| SPECIFICATION | FOCAL LENGTH (f) OF ENTIRE SYSTEM | 1.033 | 1.028 | 1.215 | 1.053 | 1.047 | 1.046 |
| CONDITIONAL EXPRESSION (1) | (R8 + R9)/(R8 − R9) | 0.309 | 0.195 | 0.143 | 0.076 | 0.170 | 0.195 |
| CONDITIONAL EXPRESSION (2) | f456/f | 2.520 | 2.463 | 2.761 | 2.513 | 2.553 | 2.554 |
| CONDITIONAL EXPRESSION (3) | D4/f | 1.865 | 1.809 | 1.761 | 1.658 | 1.937 | 2.058 |
| CONDITIONAL EXPRESSION (4) | D2/f | 1.360 | 1.517 | 1.140 | 1.912 | 1.877 | 1.871 |
| CONDITIONAL EXPRESSION (5) | f1/f | −7.320 | −7.258 | −6.709 | −7.527 | −7.730 | −7.658 |
| CONDITIONAL EXPRESSION (6) | f3/f | 6.039 | 6.054 | 6.721 | 7.899 | 6.914 | 6.823 |
| CONDITIONAL EXPRESSION (7) | f123/f | −3.385 | −3.166 | −3.070 | −2.866 | −3.378 | −3.743 |
| CONDITIONAL EXPRESSION (8) | (R1 + R2)/(R1 − R2) | 1.464 | 1.436 | 1.626 | 1.687 | 1.735 | 1.711 |
| CONDITIONAL EXPRESSION (9) | (R3 + R4)/(R3 − R4) | 1.259 | 1.431 | 1.614 | 1.0003 | 1.0003 | 1.0001 |
| CONDITIONAL EXPRESSION (10) | R5/f | 2.531 | 2.660 | 3.723 | 5.052 | 4.424 | 4.365 |
| | f456 | 2.60394 | 2.53241 | 2.76149 | 2.64611 | 2.67398 | 2.6718 |
| | f1 | −7.56347 | −7.4628 | −8.1529 | −7.92422 | −8.09684 | −8.01103 |
| | f3 | 6.23975 | 6.22425 | 8.16676 | 8.31589 | 7.24185 | 7.1377 |
| | f123 | −3.49735 | −3.25488 | −3.7306 | −3.01746 | −3.53785 | −3.91617 |

As illustrated in Table 7, Numerical Examples 1 to 6 all satisfy conditional expressions (1) to (10).

FIGS. 2, 4, 6, 8, 10, and 12 illustrate spherical aberration and astigmatism of Numerical Examples 1 to 6, respectively. In each of the figures, the short dashed line illustrates values at a C-line (656.27 nm), the solid line illustrates values at a d-line (587.56 nm), the long dashed line illustrates values at an F-line (486.13 nm) in the spherical aberration, while the solid line indicates values of a sagittal image plane at the d-line, and the broken line indicates values of a meridional image plane at the d-line.

The individual aberration diagrams clearly indicate that various aberrations are well corrected to achieve excellent imaging performance in Numerical examples 1 to 6.

[Example of Installation as On-Board Application]

Figure 13:
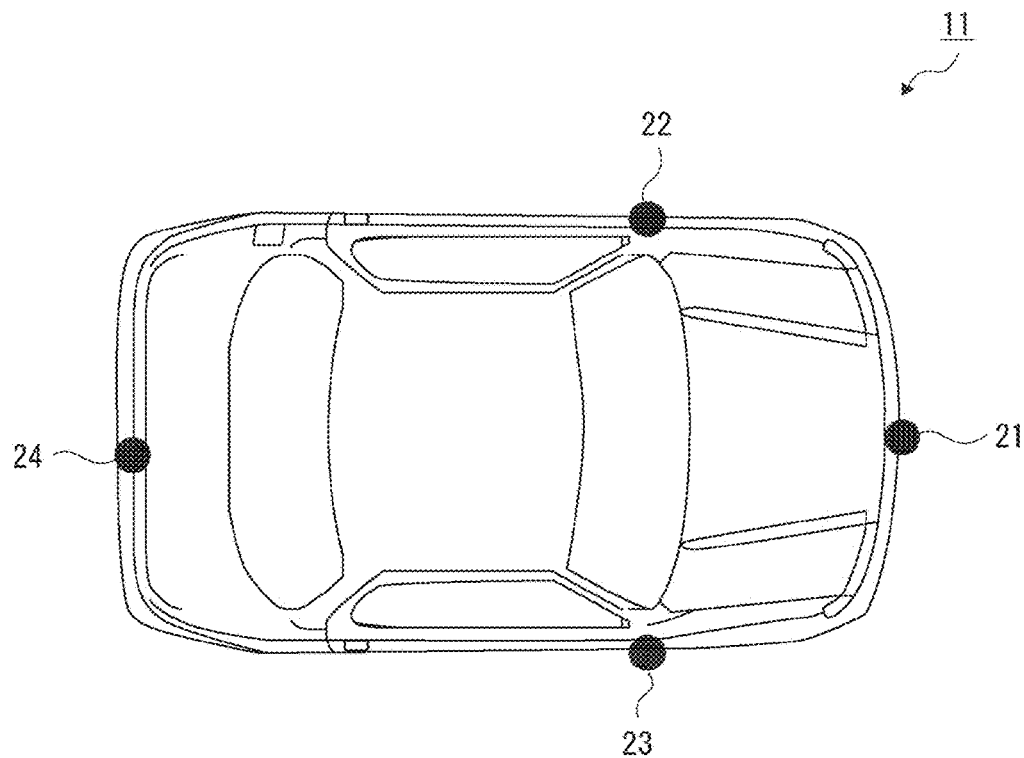
FIG. 13 is an explanatory view illustrating Installation Example 1 as an on-board application.
Figure 14:
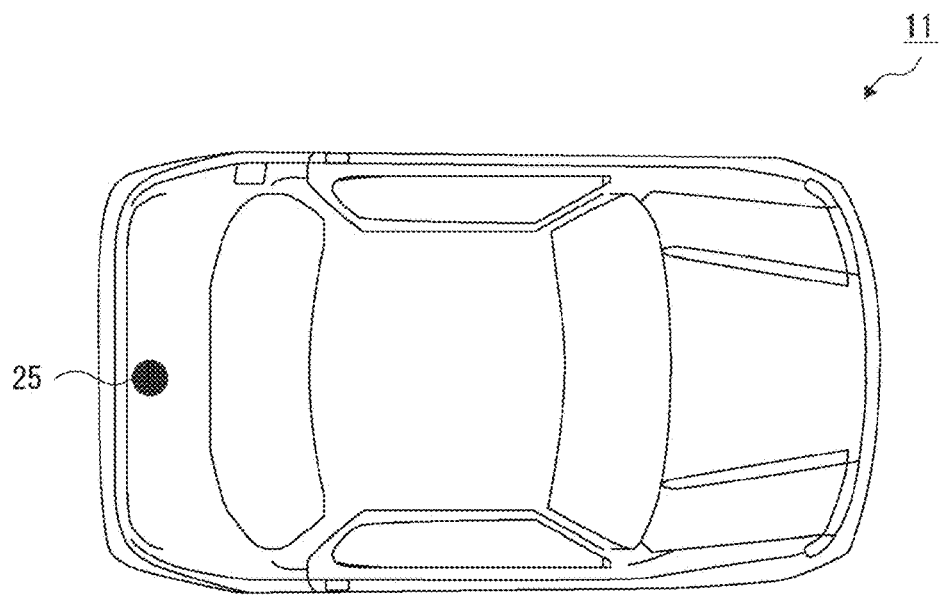
FIG. 14 is an explanatory diagram illustrating Installation Example 2 as an on-board application.

FIG. 13 illustrates Installation Example 1 as an on-board application, and FIG. 14 illustrates Installation Example 2.

Installation Example 1 as an on-board application is an installation example in which an image of 360 degrees around a vehicle 11 is obtained by four cameras each using an imaging lens. For example, a camera 21 is installed at the front, a camera 22 and a camera 23 are installed on the side and a camera 24 is installed at the rear, and a 360-degree image is obtained by combining images captured by the cameras 21, 22, 23, and 24. As the imaging lens, it is desirable to use a lens having a specification with a full angle of view of 200 degrees or more and a horizontal full angle of view of 180 degrees or more.

Installation Example 2 as an on-board application is an installation example in which a rear image of the vehicle 11 is obtained by one camera using an imaging lens. For example, a camera 25 is installed at the rear. As the imaging lens, it is desirable to use a lens having a specification with a full angle of view of 150 degrees or more and 190 degrees or less and a horizontal angle of view of 120 degrees or more and 160 degrees or less.

[Others]

The imaging lens according to the present technology may include another optical element such as a lens having no refractive power in addition to the first lens L1 to the sixth lens L6. In this case, the lens configuration of the imaging lens according to the embodiment of the present technology is achieved by substantially six lens configurations of the first lens L1 to the sixth lens L6.

[Present Technology]

The present technology can also be configured as follows.

<1>

An imaging lens including, in order from an object side to an image plane side:

a first lens having a negative refractive power and a meniscus shape with a convex surface facing an object side;

a second lens having a negative refractive power and a meniscus shape with a convex surface facing an object side;

a third lens having a positive refractive power and a meniscus shape with a convex surface facing an object side;

an aperture diaphragm;

a fourth lens having a positive refractive power and a biconvex shape;

a fifth lens having a negative refractive power and a biconcave shape; and a sixth lens having a positive refractive power and a biconvex shape, the imaging lens as a whole being formed with six groups of the six lenses being six independent lenses, the imaging lens having a full angle of view of 150 degrees or more, and satisfying the following conditional expressions (1) and (2):

$$0<(R8+R9)/(R8-R9)<0.4 \tag{1}$$

$$2<f456/f<3, \tag{2}$$

where

R8 is a radius of curvature on an optical axis of an object side surface of the fourth lens, R9 is a radius of curvature on an optical axis of an image side surface of the fourth lens, f456 is a composite focal length of the fourth lens, the fifth lens, and the sixth lens, and f is a focal length of an entire system.

<2>

The imaging lens according to <1>, satisfying the following conditional expression (3):

$$1.5<D4/f<2.3, \tag{3}$$

where

D4 is a distance on the optical axis between an image side surface of the second lens and an object side surface of the third lens, and f is the focal length of the entire system.

<3>

The imaging lens according to <1> or <2>, satisfying the following conditional expression (4):

$$1<D2/f<2, \tag{4}$$

where

D2 is a distance on the optical axis between an image side surface of the first lens and an object side surface of the second lens, and f is the focal length of the entire system.

<4>

The imaging lens according to any of <1> to <3>, satisfying the following conditional expression (5):

$$-8.5<f1/f<-6, \tag{5}$$

where f1 is a focal length of the first lens, and f is the focal length of the entire system.

<5>

The imaging lens according to any of <1> to <4>, satisfying the following conditional expression (6):

$$5.5<f3/f<8.5, \tag{6}$$

where f3 is a focal length of the third lens, and f is the focal length of the entire system.

<6>

An imaging lens including, in order from an object side to an image plane side:

a first lens having a negative refractive power and a meniscus shape with a convex surface facing an object side;

a second lens having a negative refractive power and a meniscus shape with a convex surface facing an object side;

a third lens having a positive refractive power and a meniscus shape with a convex surface facing an object side;

an aperture diaphragm;

a fourth lens having a positive refractive power and a biconvex shape;

a fifth lens having a negative refractive power and a biconcave shape; and a sixth lens having a positive refractive power and a biconvex shape, the imaging lens as a whole being formed with six groups of the six lenses being six independent lenses, the imaging lens having a full angle of view of 150 degrees or more, and satisfying the following conditional expressions (1) and (7):

$$0<(R8+R9)/(R8-R9)<0.4 \tag{1}$$

$$-4<f123/f<-2.7, \tag{7}$$

where

R8 is a radius of curvature on an optical axis of an object side surface of the fourth lens, R9 is a radius of curvature on an optical axis of an image side surface of the fourth lens, f123 is a composite focal length of the first lens, the second lens, and the third lens, and f is a focal length of an entire system.

<7>

The imaging lens according to <6>, satisfying the following conditional expression (3):

$$1.5<D4/f<2.3, \tag{3}$$

where

D4 is a distance on the optical axis between an image side surface of the second lens and an object side surface of the third lens, and f is the focal length of the entire system.

<8>

The imaging lens according to <6> or <7>, satisfying the following conditional expression (4):

$$1<D2/f<2, \tag{4}$$

where

D2 is a distance on the optical axis between an image side surface of the first lens and an object side surface of the second lens, and f is the focal length of the entire system.

<9>

The imaging lens according to any of <6> to <8>, satisfying the following conditional expression (5):

$$-8.5<f1/f<-6, \tag{5}$$

where f1 is a focal length of the first lens, and f is the focal length of the entire system.

<10>

The imaging lens according to any of <6> to <9>, satisfying the following conditional expression (6):

$$5.5<f3/f<8.5, \quad (6)$$

where
f3 is a focal length of the third lens, and
f is the focal length of the entire system.

<11>

An imaging lens including, in order from an object side to an image plane side:
a first lens having a negative refractive power and a meniscus shape with a convex surface facing an object side;
a second lens having a negative refractive power and a meniscus shape with a convex surface facing an object side;
a third lens having a positive refractive power and a meniscus shape with a convex surface facing an object side;
an aperture diaphragm;
a fourth lens having a positive refractive power and a biconvex shape;
a fifth lens having a negative refractive power and a biconcave shape; and
a sixth lens having a positive refractive power and a biconvex shape,
the imaging lens as a whole being formed with six groups of the six lenses being six independent lenses,
the imaging lens having a full angle of view of 150 degrees or more, and satisfying the following conditional expressions (1) and (8):

$$0<(R8+R9)/(R8-R9)<0.4 \quad (1)$$

$$1.3<(R1+R2)/(R1-R2)<1.9, \quad (8)$$

where
R8 is a radius of curvature on an optical axis of an object side surface of the fourth lens,
R9 is a radius of curvature on an optical axis of an image side surface of the fourth lens,
R1 is a radius of curvature on an optical axis of an object side surface of the first lens, and
R2 is a radius of curvature on an optical axis of an image side surface of the first lens.

<12>

The imaging lens according to <11>, satisfying the following conditional expression (3):

$$1.5<D4/f<2.3, \quad (3)$$

where
D4 is a distance on the optical axis between an image side surface of the second lens and an object side surface of the third lens, and
f is a focal length of an entire system.

<13>

The imaging lens according to <11> or <12>, satisfying the following conditional expression (4):

$$1<D2/f<2, \quad (4)$$

where
D2 is a distance on the optical axis between the image side surface of the first lens and an object side surface of the second lens, and
f is the focal length of the entire system.

<14>

The imaging lens according to any of <11> to <13>, satisfying the following conditional expression (5):

$$-8.5<f1/f<-6, \quad (5)$$

where
f1 is a focal length of the first lens, and
f is the focal length of the entire system.

<15>

The imaging lens according to any of <11> to <14>, satisfying the following conditional expression (6):

$$5.5<f3/f<8.5, \quad (6)$$

where
f3 is a focal length of the third lens, and
f is the focal length of the entire system.

<16>

An imaging lens including, in order from an object side to an image plane side:
a first lens having a negative refractive power and a meniscus shape with a convex surface facing an object side;
a second lens having a negative refractive power and a meniscus shape with a convex surface facing an object side;
a third lens having a positive refractive power and a meniscus shape with a convex surface facing an object side;
an aperture diaphragm;
a fourth lens having a positive refractive power and a biconvex shape;
a fifth lens having a negative refractive power and a biconcave shape; and
a sixth lens having a positive refractive power and a biconvex shape,
the imaging lens as a whole being formed with six groups of the six lenses being six independent lenses,
the imaging lens having a full angle of view of 150 degrees or more, and satisfying the following conditional expressions (1) and (9):

$$0<(R8+R9)/(R8-R9)<0.4 \quad (1)$$

$$1<(R3+R4)/(R3-R4)<1.63, \quad (9)$$

where
R8 is a radius of curvature on an optical axis of an object side surface of the fourth lens,
R9 is a radius of curvature on an optical axis of an image side surface of the fourth lens,
R3 is a radius of curvature on an optical axis of an object side surface of the second lens, and
R4 is a radius of curvature on an optical axis of an image side surface of the second lens.

<17>

The imaging lens according to <16>, satisfying the following conditional expression (3):

$$1.5<D4/f<2.3, \quad (3)$$

where
D4 is a distance on the optical axis between the image side surface of the second lens and an object side surface of the third lens, and
f is a focal length of an entire system.

<18>

The imaging lens according to <16> or <17>, satisfying the following conditional expression (4):

$$1<D2/f<2, \quad (4)$$

where
D2 is a distance on the optical axis between an image side surface of the first lens and the object side surface of the second lens, and
f is the focal length of the entire system.

<19>

The imaging lens according to any of <16> to <18>, satisfying the following conditional expression (5):

$$-8.5<f1/f<-6, \quad (5)$$

where f1 is a focal length of the first lens, and f is the focal length of the entire system.

<20>

The imaging lens according to any of <16> to <19>, satisfying the following conditional expression (6):

$$5.5<f3/f<8.5, \quad (6)$$

where f3 is a focal length of the third lens, and f is the focal length of the entire system.

<21>

An imaging lens including, in order from an object side to an image plane side:

a first lens having a negative refractive power and a meniscus shape with a convex surface facing an object side;

a second lens having a negative refractive power and a meniscus shape with a convex surface facing an object side;

a third lens having a positive refractive power and a meniscus shape with a convex surface facing an object side;

an aperture diaphragm;

a fourth lens having a positive refractive power and a biconvex shape;

a fifth lens having a negative refractive power and a biconcave shape; and a sixth lens having a positive refractive power and a biconvex shape, the imaging lens as a whole being formed with six groups of the six lenses being six independent lenses, the imaging lens having a full angle of view of 150 degrees or more, and satisfying the following conditional expressions (1) and (10):

$$0<(R8+R9)/(R8-R9)<0.4 \quad (1)$$

$$2.35<R5/f<5.5, \quad (10)$$

where

R8 is a radius of curvature on an optical axis of an object side surface of the fourth lens, R9 is a radius of curvature on an optical axis of an image side surface of the fourth lens, R5 is a radius of curvature on an optical axis of an object side surface of the third lens, and f is a focal length of an entire system.

<22>

The imaging lens according to <21>, satisfying the following conditional expression (3):

$$1.5<D4/f<2.3, \quad (3)$$

where

D4 is a distance on the optical axis between an image side surface of the second lens and the object side surface of the third lens, and f is the focal length of the entire system.

<23>

The imaging lens according to <21> or <22>, satisfying the following conditional expression (4):

$$1<D2/f<2, \quad (4)$$

where

D2 is a distance on the optical axis between an image side surface of the first lens and an object side surface of the second lens, and f is the focal length of the entire system.

<24>

The imaging lens according to any of <21> to <23>, satisfying the following conditional expression (5):

$$-8.5<f1/f<-6, \quad (5)$$

where f1 is a focal length of the first lens, and f is the focal length of the entire system.

<25>

The imaging lens according to any of <21> to <24>, satisfying the following conditional expression (6):

$$5.5<f3/f<8.5, \quad (6)$$

where f3 is a focal length of the third lens, and f is the focal length of the entire system.

REFERENCE SIGNS LIST

1 Imaging lens
2 Imaging lens
3 Imaging lens
4 Imaging lens
5 Imaging lens
6 Imaging lens
L1 First lens
L2 Second lens
L3 Third lens
L4 Fourth lens
L5 Fifth lens
L6 Sixth lens
S Aperture diaphragm
CG Parallel plate
IM Image plane
Z Optical axis

The invention claimed is:

1. An imaging lens comprising, in order from an object side to an image plane side:

a first lens having a negative refractive power and a meniscus shape with a convex surface facing an object side;

a second lens having a negative refractive power and a meniscus shape with a convex surface facing an object side;

a third lens having a positive refractive power and a meniscus shape with a convex surface facing an object side;

an aperture diaphragm;

a fourth lens having a positive refractive power and a biconvex shape;

a fifth lens having a negative refractive power and a biconcave shape; and a sixth lens having a positive refractive power and a biconvex shape, each of the first, second, third, fourth, fifth, and sixth lenses being independently arranged and being the only lenses within the imaging lens, the imaging lens having a full angle of view of 150 degrees or more, and satisfying the following conditional expressions (1) and (2):

$$0<(R8+R9)/(R8-R9)<0.4 \quad (1)$$

$$2<f456/f<3, \quad (2)$$

where
R8 is a radius of curvature on an optical axis of an object side surface of the fourth lens,
R9 is a radius of curvature on an optical axis of an image side surface of the fourth lens,
f456 is a composite focal length of the fourth lens, the fifth lens, and the sixth lens, and
f is a focal length of an entire system.

2. The imaging lens according to claim 1, satisfying the following conditional expression (3):

$$1.5<D4/f<2.3, \quad (3)$$

where
D4 is a distance on the optical axis between an image side surface of the second lens and an object side surface of the third lens, and
f is the focal length of the entire system.

3. The imaging lens according to claim 1, satisfying the following conditional expression (4):

$$1<D2/f<2, \quad (4)$$

where
D2 is a distance on the optical axis between an image side surface of the first lens and an object side surface of the second lens, and
f is the focal length of the entire system.

4. The imaging lens according to claim 1, satisfying the following conditional expression (5):

$$-8.5<f1/f<-6, \quad (5)$$

where
f1 is a focal length of the first lens, and
f is the focal length of the entire system.

5. The imaging lens according to claim 1, satisfying the following conditional expression (6):

$$5.5<f3/f<8.5, \quad (6)$$

where
f3 is a focal length of the third lens, and
f is the focal length of the entire system.

6. An imaging lens comprising, in order from an object side to an image plane side:
a first lens having a negative refractive power and a meniscus shape with a convex surface facing an object side;
a second lens having a negative refractive power and a meniscus shape with a convex surface facing an object side;
a third lens having a positive refractive power and a meniscus shape with a convex surface facing an object side;
an aperture diaphragm;
a fourth lens having a positive refractive power and a biconvex shape;
a fifth lens having a negative refractive power and a biconcave shape; and
a sixth lens having a positive refractive power and a biconvex shape,
each of the first, second, third, fourth, fifth, and sixth lenses being independently arranged and being the only lenses within the imaging lens,
the imaging lens having a full angle of view of 150 degrees or more, and satisfying the following conditional expressions (1) and (7):

$$0<(R8+R9)/(R8-R9)<0.4 \quad (1)$$

$$-4<f123/f<-2.7, \quad (7)$$

where
R8 is a radius of curvature on an optical axis of an object side surface of the fourth lens,
R9 is a radius of curvature on an optical axis of an image side surface of the fourth lens,
f123 is a composite focal length of the first lens, the second lens, and the third lens, and
f is a focal length of an entire system.

7. The imaging lens according to claim 6, satisfying the following conditional expression (3):

$$1.5<D4/f<2.3, \quad (3)$$

where
D4 is a distance on the optical axis between an image side surface of the second lens and an object side surface of the third lens, and
f is the focal length of the entire system.

8. The imaging lens according to claim 6, satisfying the following conditional expression (4):

$$1<D2/f<2, \quad (4)$$

where
D2 is a distance on the optical axis between an image side surface of the first lens and an object side surface of the second lens, and
f is the focal length of the entire system.

9. The imaging lens according to claim 6, satisfying the following conditional expression (5):

$$-8.5<f1/f<-6, \quad (5)$$

where
f1 is a focal length of the first lens, and
f is the focal length of the entire system.

10. The imaging lens according to claim 6, satisfying the following conditional expression (6):

$$5.5<f3/f<8.5, \quad (6)$$

where
f3 is a focal length of the third lens, and
f is the focal length of the entire system.

11. An imaging lens comprising, in order from an object side to an image plane side:
a first lens having a negative refractive power and a meniscus shape with a convex surface facing an object side;
a second lens having a negative refractive power and a meniscus shape with a convex surface facing an object side;
a third lens having a positive refractive power and a meniscus shape with a convex surface facing an object side;
an aperture diaphragm;
a fourth lens having a positive refractive power and a biconvex shape;
a fifth lens having a negative refractive power and a biconcave shape; and
a sixth lens having a positive refractive power and a biconvex shape,
each of the first, second, third, fourth, fifth, and sixth lenses being independently arranged and being the only lenses within the imaging lens,
the imaging lens having a full angle of view of 150 degrees or more, and satisfying the following conditional expressions (1) and (8):

$$0<(R8+R9)/(R8-R9)<0.4 \quad (1)$$

$$1.3<(R1+R2)/(R1-R2)<1.9, \quad (8)$$

where
R8 is a radius of curvature on an optical axis of an object side surface of the fourth lens,
R9 is a radius of curvature on an optical axis of an image side surface of the fourth lens,
R1 is a radius of curvature on an optical axis of an object side surface of the first lens, and
R2 is a radius of curvature on an optical axis of an image side surface of the first lens.

12. The imaging lens according to claim 11, satisfying the following conditional expression (3):

$$1.5 < D4/f < 2.3, \tag{3}$$

where
D4 is a distance on the optical axis between an image side surface of the second lens and an object side surface of the third lens, and
f is a focal length of an entire system.

13. The imaging lens according to claim 11, satisfying the following conditional expression (4):

$$1 < D2/f < 2, \tag{4}$$

where
D2 is a distance on the optical axis between the image side surface of the first lens and an object side surface of the second lens, and
f is a focal length of an entire system.

14. The imaging lens according to claim 11, satisfying the following conditional expression (5):

$$-8.5 < f1/f < -6, \tag{5}$$

where
f1 is a focal length of the first lens, and
f is a focal length of an entire system.

15. The imaging lens according to claim 11, satisfying the following conditional expression (6):

$$5.5 < f3/f < 8.5, \tag{6}$$

where
f3 is a focal length of the third lens, and
f is a focal length of an entire system.

16. An imaging lens comprising, in order from an object side to an image plane side:
a first lens having a negative refractive power and a meniscus shape with a convex surface facing an object side;
a second lens having a negative refractive power and a meniscus shape with a convex surface facing an object side;
a third lens having a positive refractive power and a meniscus shape with a convex surface facing an object side;
an aperture diaphragm;
a fourth lens having a positive refractive power and a biconvex shape;
a fifth lens having a negative refractive power and a biconcave shape; and
a sixth lens having a positive refractive power and a biconvex shape,
each of the first, second, third, fourth, fifth, and sixth lenses being independently arranged and being the only lenses within the imaging lens,
the imaging lens having a full angle of view of 150 degrees or more, and satisfying the following conditional expressions (1) and (9):

$$0 < (R8+R9)/(R8-R9) < 0.4 \tag{1}$$

$$1 < (R3+R4)/(R3-R4) < 1.63, \tag{9}$$

where
R8 is a radius of curvature on an optical axis of an object side surface of the fourth lens,
R9 is a radius of curvature on an optical axis of an image side surface of the fourth lens,
R3 is a radius of curvature on an optical axis of an object side surface of the second lens, and
R4 is a radius of curvature on an optical axis of an image side surface of the second lens.

17. The imaging lens according to claim 16, satisfying the following conditional expression (3):

$$1.5 < D4/f < 2.3, \tag{3}$$

where
D4 is a distance on the optical axis between the image side surface of the second lens and an object side surface of the third lens, and
f is a focal length of an entire system.

18. The imaging lens according to claim 16, satisfying the following conditional expression (4):

$$1 < D2/f < 2, \tag{4}$$

where
D2 is a distance on the optical axis between an image side surface of the first lens and the object side surface of the second lens, and
f is a focal length of an entire system.

19. The imaging lens according to claim 16, satisfying the following conditional expression (5):

$$-8.5 < f1/f < -6, \tag{5}$$

where
f1 is a focal length of the first lens, and
f is a focal length of an entire system.

20. The imaging lens according to claim 16, satisfying the following conditional expression (6):

$$5.5 < f3/f < 8.5, \tag{6}$$

where
f3 is a focal length of the third lens, and
f is a focal length of an entire system.

21. An imaging lens comprising, in order from an object side to an image plane side:
a first lens having a negative refractive power and a meniscus shape with a convex surface facing an object side;
a second lens having a negative refractive power and a meniscus shape with a convex surface facing an object side;
a third lens having a positive refractive power and a meniscus shape with a convex surface facing an object side;
an aperture diaphragm;
a fourth lens having a positive refractive power and a biconvex shape;
a fifth lens having a negative refractive power and a biconcave shape; and
a sixth lens having a positive refractive power and a biconvex shape,
each of the first, second, third, fourth, fifth, and sixth lenses being independently arranged and being the only lenses within the imaging lens,
the imaging lens having a full angle of view of 150 degrees or more, and satisfying the following conditional expressions (1) and (10):

$$0 < (R8+R9)/(R8-R9) < 0.4 \tag{1}$$

$$2.35 < R5/f < 5.5, \tag{10}$$

where

R8 is a radius of curvature on an optical axis of an object side surface of the fourth lens, R9 is a radius of curvature on an optical axis of an image side surface of the fourth lens, R5 is a radius of curvature on an optical axis of an object side surface of the third lens, and f is a focal length of an entire system.

22. The imaging lens according to claim 21, satisfying the following conditional expression (3):

$$1.5 < D4/f < 2.3, \qquad (3)$$

where

D4 is a distance on the optical axis between an image side surface of the second lens and the object side surface of the third lens, and f is the focal length of the entire system.

23. The imaging lens according to claim 21, satisfying the following conditional expression (4):

$$1 < D2/f < 2, \qquad (4)$$

where

D2 is a distance on the optical axis between an image side surface of the first lens and an object side surface of the second lens, and f is the focal length of the entire system.

24. The imaging lens according to claim 21, satisfying the following conditional expression (5):

$$-8.5 < f1/f < -6, \qquad (5)$$

where f1 is a focal length of the first lens, and f is the focal length of the entire system.

25. The imaging lens according to claim 21, satisfying the following conditional expression (6):

$$5.5 < f3/f < 8.5, \qquad (6)$$

where f3 is a focal length of the third lens, and f is the focal length of the entire system.

* * * * *